United States Patent
Greene

(10) Patent No.: US 6,578,145 B1
(45) Date of Patent: Jun. 10, 2003

(54) METHODS AND SYSTEMS FOR SECURELY COMMUNICATING PERSONAL IDENTIFICATION NUMBER INFORMATION BETWEEN A SECURITY MODULE AND A PLURALITY OF SECURE KEYPAD DEVICES

(75) Inventor: John C. Greene, Greensboro, NC (US)

(73) Assignee: Gilbarco Inc., Greensboro, NC (US)

( * ) Notice: Subject to any disclaimer, the term of this patent is extended or adjusted under 35 U.S.C. 154(b) by 0 days.

(21) Appl. No.: 09/342,721

(22) Filed: Jun. 29, 1999

(51) Int. Cl.[7] .................................................. G06F 1/24
(52) U.S. Cl. ........................ 713/182; 713/150; 713/153; 713/200; 713/201
(58) Field of Search ................................ 713/150, 153, 713/182, 200, 201

(56) References Cited

U.S. PATENT DOCUMENTS

| | | |
|---|---|---|
| 4,479,112 A | 10/1984 | Hirsch |
| 4,500,751 A | 2/1985 | Darland et al. |
| 4,900,903 A | 2/1990 | Wright et al. |
| 4,926,173 A | 5/1990 | Frielink |
| 5,025,255 A | 6/1991 | Mould |
| 5,254,989 A | 10/1993 | Verrier et al. |
| 5,280,283 A | 1/1994 | Raasch et al. |
| 5,384,850 A | 1/1995 | Johnson et al. |
| 5,632,011 A * | 5/1997 | Landfield et al. ............ 709/206 |
| 5,673,316 A * | 9/1997 | Auerbach et al. ............. 705/51 |
| 5,694,472 A * | 12/1997 | Johnson et al. ............. 380/277 |
| 5,724,425 A * | 3/1998 | Chang et al. .................. 380/30 |
| 5,790,410 A | 8/1998 | Warn et al. |

* cited by examiner

Primary Examiner—Thomas R. Peeso
(74) Attorney, Agent, or Firm—Withrow & Terranova PLLC

(57) ABSTRACT

A system and method for connecting and operating two (2) or more secure keypad devices under the domain of a single processing board is disclosed. The processing board communicates with a security module responsible for host transaction processing. The processing board lies between the keypad and the security module serving both the security module (downstream) and the keypad(s) (upstream). The system permits multiple secure keypads to be used in a manner that is invisible to the security module. A unique message sequence is disclosed among multiple keypads in which only one keypad may be deemed active at a given moment for purposes of passing transaction data through the processing board to the security module. The processing board is responsible for linking each of the keypads together and funneling message traffic among them. A system is disclosed for secure PIN transactions occurring at a single pay point between a plurality of secure keypad devices and a security module configured to communicate with a single secure keypad device. The system may not include an intercessor device between the secure keypad devices and the security module.

36 Claims, 24 Drawing Sheets

Data Flow Between Secure Keypads Devices

PIN Block Transmitted from Single Secure Keypad

Data Flow Between Secure Keypads Devices

Dual Secure Keypad UKPT Base Key Download Process

PIN Transaction Initiated by CRIND BIOS

Master Secure Keypad Acquires PIN Token

PIN Block Transmitted from Single Secure Keypad

PIN Block Transmitted from Satellite Secure Keypad

Data Flow Between Secure Keypad devices

Multiple Secure Keypad UKPT Base Key Download Process

PIN Transmission Initiated by Application

Satellite Secure Keypad Acquires PIN Token

PIN Block Transmitted from Master Secure Keypad

PIN Block Transmitted from Secure Keypad #1

PIN Block Transmitted from other Secure Keypads

Encryption Counter Synchronization

Data Flow Between Secure Keypad Devices

Multiple Secure Keypad UKPT Base Key Download Process

PIN Transaction Initiated by Application

Satellite Secure Keypad Acquires PIN Token

PIN Block Transmitted from Master Secure Keypad

Encryption Counter Synchronization

METHODS AND SYSTEMS FOR SECURELY COMMUNICATING PERSONAL IDENTIFICATION NUMBER INFORMATION BETWEEN A SECURITY MODULE AND A PLURALITY OF SECURE KEYPAD DEVICES

TECHNICAL FIELD

The present invention relates to an apparatus having multiple point-of-sale card reading/keypad devices on each operable side of an energy dispensing apparatus. More particularly, the present invention relates to an apparatus having secure multiple point-of-sale card reading/keypad devices wherein the placement of one of the aforementioned card reader/keypad devices is such that it is conveniently accessible to disabled individuals.

BACKGROUND ART

In retail environments such as stores and service stations, there is a need for maintaining security of customer-entered Personal Identification Numbers (PINs). This is especially true in gasoline service stations where the customer may initiate the sale of the product by inserting a magnetic strip credit or debit card (or other type of information bearing card) into a card reader which is mounted on a gasoline dispenser, or perhaps elsewhere in a service station. The customer then enters a PIN number via a keypad. The PIN is transmitted along with data read from the magnetic strip to a host computer which can compare the PIN and data from the card to authorize a purchase.

The PIN must be protected from disclosure so that unauthorized persons may not use the PIN in conjunction with the card to defraud either the legitimate card holder, the vendor or an authorizing financial institution or card issuer. In some service station circumstances, the customer is requested to enter his/her PIN number using a keypad which is a part of the dispenser housing. Alternatively, he/she may enter the number using a special purpose PIN pad (commercially available from several different companies), when the sale is controlled from a point of sale console. It is desirable, and required in most instances, that the PIN number be encrypted at the point of entry so that no transmissions of the clear text (i.e. not encrypted) PIN occur across any transmission medium that is subject to interception. Thus, it is desirable to use encryption techniques in the PIN pads and in the dispensers if they are such points of entry. Typically, the PIN pads and/or dispensers must be injected with cryptographic keys which are used in the encryption process for exchange of PIN data.

The injection must be done in a secure environment because the cryptographic keys must be initially loaded into PIN pads or dispensers in their clear text form and are therefore subject to interception. PIN pads are small, easily replaceable, and easily injected with cryptographic keys in a secure environment. However, this is not true of dispensers because they require periodic service, which cause them to lose their key data and necessitate another injection process. Since the dispensers are bulky, the removal of the dispenser and shipment to a secure environment for re-keying are impractical. Installing separate, replaceable PIN pads in the dispensers is feasible, but not cost effective for service stations which have a large number of dispensers and requires a large inventory of replacement devices.

Also, it would be desirable to have the encryption keys used in the host system as secure as possible, since unauthorized access to those keys could lead to large losses. If each dispenser has the host system encryption key in it, the chances for loss increase. Accordingly, it would be desirable to avoid injecting the host keys into the dispensers, or any part of the dispenser, to enhance security.

The problem solved by the present invention is connecting two or more PIN-pad devices (e.g. Keypads), such as a Gilbarco, Inc. SmartPad™, to one CRIND® BIOS (basic input/output system) board in a way that is invisible to entities downstream of the BIOS in the communication sequence (e.g., CRIND® Application, G-SITE®, Gilbarco Security Module (GSM), etc.). Providing multiple PIN-pad devices is important in order to meet Americans with Disabilities Act (ADA) governmental requirements for providing access to energy dispensers to handicapped individuals.

CRIND® is an acronym for "Card Reader IN Dispenser" which is a style of energy dispensing apparatus made and sold by Gilbarco, Inc., of Greensboro, N.C. Usage of the term CRIND® in this application implies an energy dispensing apparatus having card reading and keypad capabilities. These capabilities typically include communication of card information to a remotely (i.e., not on the energy dispensing apparatus) situated station controller. If desired, a CRIND® board can be configured to process touchscreen input data as well. The CRIND® board need not, however, be restricted to the energy dispensing arts as it is applicable to virtually any point-of-sale device having multiple keypad inputs.

To meet the requirements under the ADA given the physical construction of some energy dispensers, it is desirable to place a second keypad on the dispenser in an area reachable to disabled persons. Where secure keypads are desired, it is then required that both keypads on the dispenser be secure keypads such as a Gilbarco, Inc. SmartPad™. Since secure keypads require a unique key per transaction (UKPT) base key in order to perform debit operations, and since the security module (GSM) device does not currently support two independent secure keypads at a single pay-point, it is desirable to add a second secure keypad to the pay-point in a manner invisible to the security module (GSM) device.

Referring now to the drawings, FIG. 1 illustrates conventional PIN block transmission from a single secure keypad 10 to the CRIND® 12 BIOS, and to the security module 14 (GSM) for subsequent host-specific encryption and transmission. The PIN block 16 is first encrypted with a unique key per transaction (UKPT) key 19, then encrypted with the master/session key 20 and sent to the CRIND® board 12. The CRIND® 12 BIOS then removes the master/session encryption layer and transmits the UKPT-encrypted PIN block to the GSM 14. The GSM 14 then decrypts the UKPT-encrypted PIN block for subsequent processing. The security module 14 cannot perform the master/session decryption because the secure keypad was added to the architecture after a period where the CRIND® 12 handled the encryption of the PIN block.

Current security modules (GSMs) do not support multiple sources of UKPT-encrypted PIN blocks from a single pay-point. To do so would require additional data blocks and protocol changes to the security module firmware in order to support the UKPT approach for each additional secure keypad. Since there is an extensive population of security module devices in the field that do not support multiple secure keypads at a single pay-point, it is most desirable to make any such change invisible to the security module (GSM).

The present invention provides a system and method of adding multiple secure keypads to a system that currently supports only one secure keypad without compromising security or backward compatibility.

DISCLOSURE OF THE INVENTION

The present invention provides a system and method of adding multiple secure keypads to a single pay-point without affecting the site security module. This is accomplished by creating a master/satellite architecture in which the original secure keypad becomes the master to additional satellite secure keypads. In this architecture, the master secure keypad becomes a "virtual site security module" to the satellite keypads, thus relaying the encryption data provided by the site security module in an equally or more secure manner to the satellites.

According to one aspect of the invention, two (2) or more secure keypad devices are connected to a single CRIND® board that communicates with a security module such that either keypad may initiate and perform a consumer transaction. Between the keypad(s) and the security module sits the CRIND® board which serves both the security module downstream (transaction authorization) and the keypad upstream (transaction initiation). The present invention presents a new architecture on the upstream side of the CRIND® board which permits multiple secure keypads to be used in a manner that is invisible to the security module. A unique message sequence is disclosed among multiple keypads in which only one keypad may be deemed active at a given moment for purposes of passing transaction data through the CRIND® board to the security module. The CRIND® board is responsible for linking each of the keypads together and funneling message traffic among them. In one embodiment, one keypad is deemed the master, acting as a virtual security module, while all other keypads are deemed satellites.

As used herein, the phrase "secure keypad device" refers to any device capable of receiving personal identification number information from a customer and forwarding the personal identification number information to another secure keypad device or to the security module. Any such device may include a keypad, a touch screen, or other input device for receiving input from a customer, an encryption unit for encrypting the input from the customer and a decryption unit for decrypting information from other secure keypad devices or from the security module. A secure keypad device may also include communication circuitry for communicating with other keypad devices or with the security module.

According to another aspect, the present invention may include a two-level secure keypad arrangement in which a master secure keypad communicates with multiple satellite secure keypads and with the security module. The satellite secure keypads have a common architectural level. This architecture eliminates the need for an intercessor device, such as the CRIND® BIOS between the secure keypads and the security module.

According to another aspect, the present invention includes an N-leveled secure keypad arrangement in which a master secure keypad is located on a first architectural level and a plurality of satellite secure keypads are located on successive architectural levels higher than the first architectural level. This architecture eliminates the need for an intercessor device, such as the CRIND® BIOS, between the secure keypads and the security module.

It is, therefore, an object of the present invention to provide for multiple secure keypad devices at a single pay point.

It is a further object of the present invention to provide for multiple secure keypad devices at a single pay point in which keypad activity is invisible to a downstream security module responsible for host transaction processing.

Some of the objects of the invention having been stated hereinabove, other objects will become evident as the description proceeds, when taken in connection with the accompanying drawings as best described hereinbelow.

BRIEF DESCRIPTION OF THE DRAWINGS

A description of the present invention will now proceed with reference to the accompanying drawings, of which.

BEST MODE FOR CARRYING OUT THE INVENTION

The present invention provides a system and method of adding multiple secure keypads to a single pay-point without affecting the site security module. This is accomplished by creating a master/satellite architecture in which the original secure keypad becomes the master to additional satellite secure keypads. In one implement of this architecture, the master secure keypad becomes a "virtual site security module" to the satellite keypads, thus relaying the encryption data provided by the site security module in an equally or more secure manner to the satellites.

Three embodiments of the master/satellite architecture are described below. In the first embodiment, a master secure keypad and a satellite secure keypad communicate with an intercessor module which communicates with the security module. In the second embodiment, the master secure keypad communicates with at least one secure keypad on the same architectural level. In the third embodiment, the master secure keypad communicates with a single satellite secure keypad on a higher architectural level. The satellite secure keypad may communicate with an additional satellite secure keypad on an even higher architectural level.

First Embodiment

Figure 1:
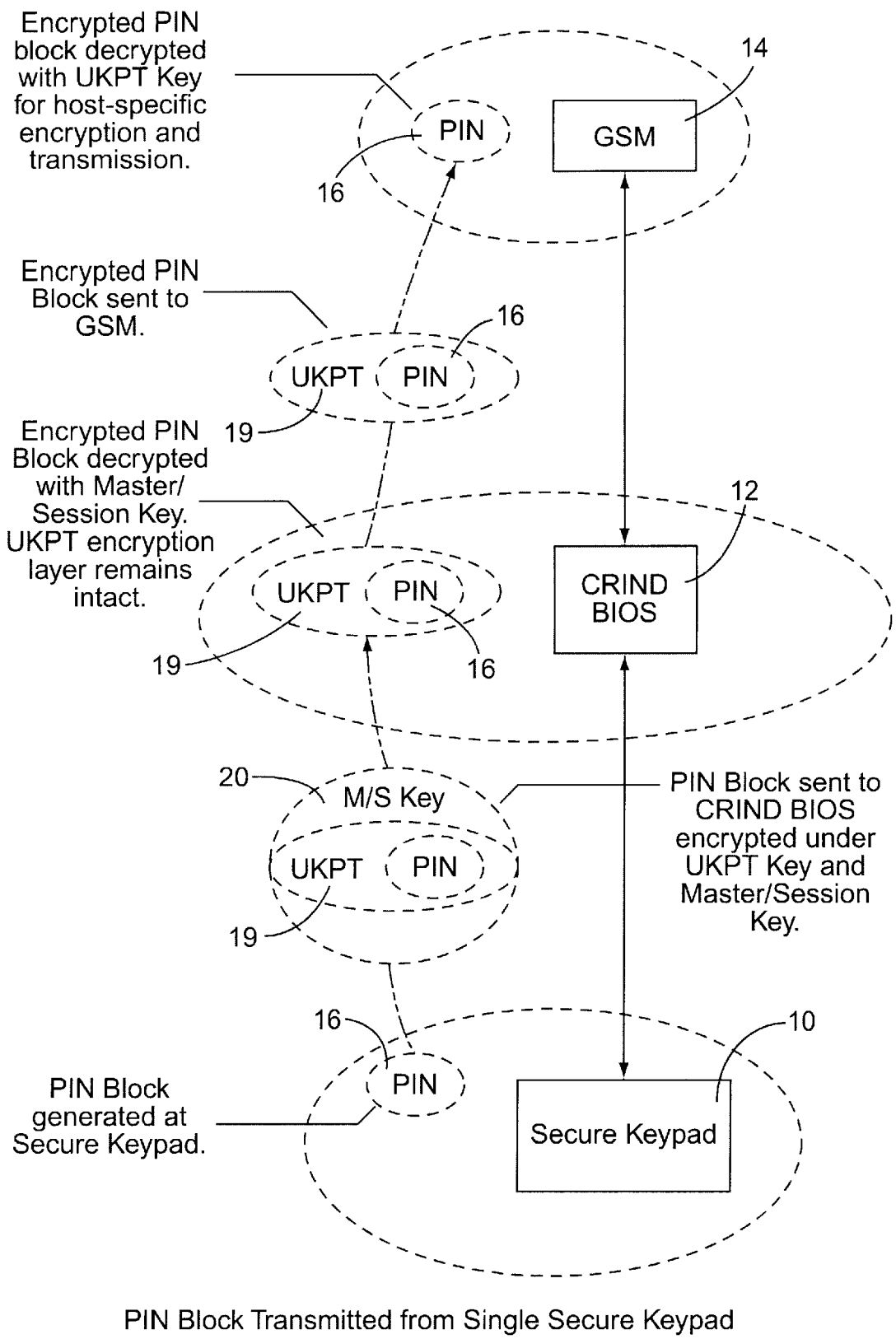
FIG. 1 is a schematic block diagram illustrating conventional transmission of a PIN block from a single secure keypad.
Figure 2:
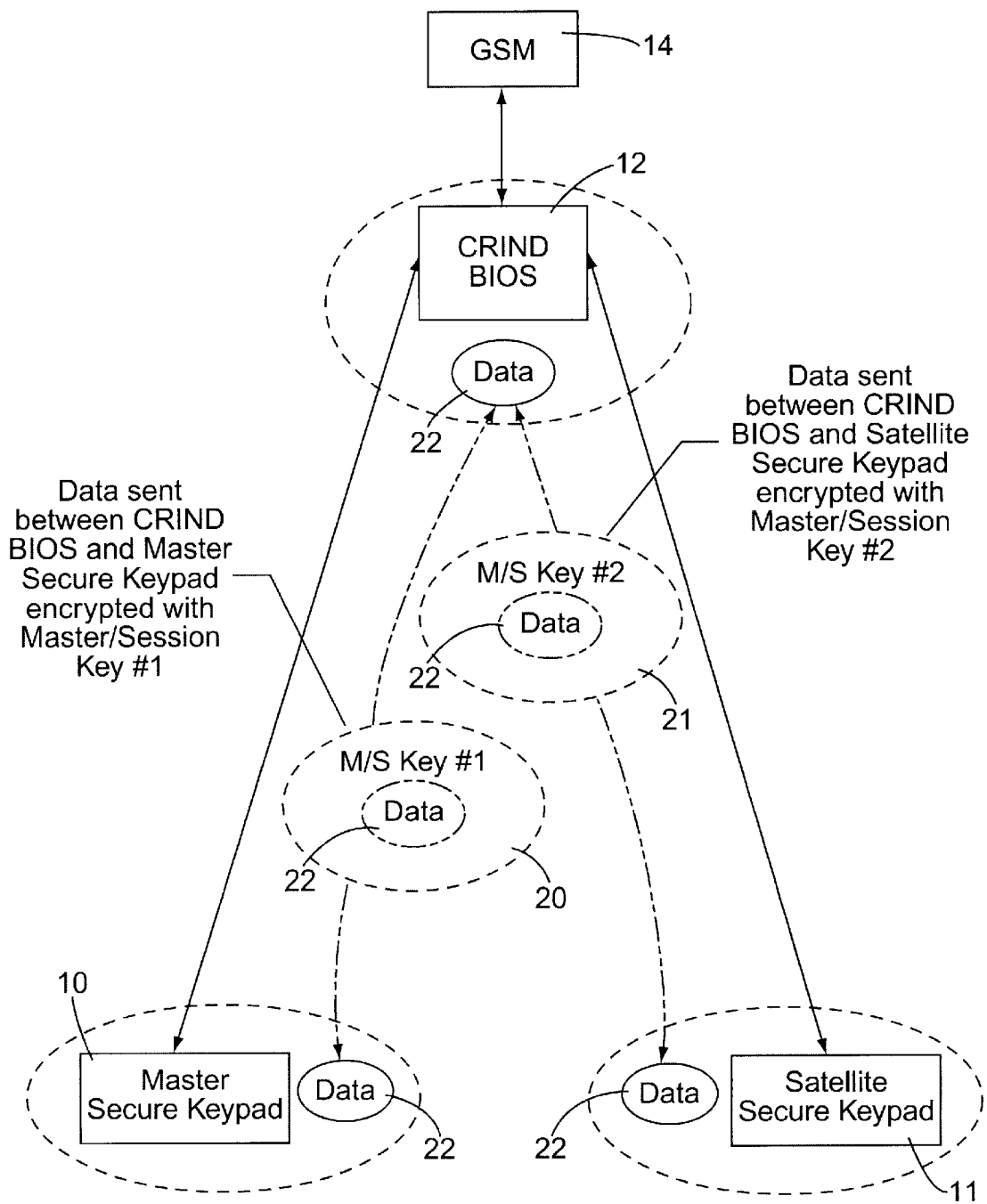
FIG. 2 is a schematic block diagram illustrating the data flow between two secure keypad devices according to a first embodiment of the present invention.

FIG. 2 shows the logical configuration of the dual secure keypad implementation according to a first embodiment of the invention. Although both secure keypads are electrically connected to the CRIND® 12 BIOS, the generic CRIND® line-level protocol does not allow the secure keypads to communicate directly with each other. Therefore, the CRIND® 12 BIOS acts as a message relay to receive a message from one secure keypad 10 and send it to the other secure keypad 11.

In order to relay data from one secure keypad 10 to another secure keypad 11, the CRIND® 12 BIOS performs an individual exponential key exchange (EKE) session with each secure keypad independently in order to establish master/session keys for message-level encryption. Once a safe encryption level has been established, one secure keypad 10 sends a message to the CRIND® 12 BIOS under an encryption layer. The CRIND® 12 BIOS then decrypts the message with the appropriate key 20 for the sending secure keypad. Once the message is decrypted, the BIOS re-encrypts it with the appropriate key 21 for the receiving secure keypad 11 and relays the message.

The existing site configuration for debit assumes one secure PIN-pad device per dispensing position. In order to maintain full compatibility with this architecture, the dual secure keypad system relays the UKPT base key from the master secure keypad 10 to the satellite secure keypad 11 in the manner shown in FIG. 3. This method allows both secure keypads to use the same UKPT key sequence such that it is invisible to the security module.

Figure 3:
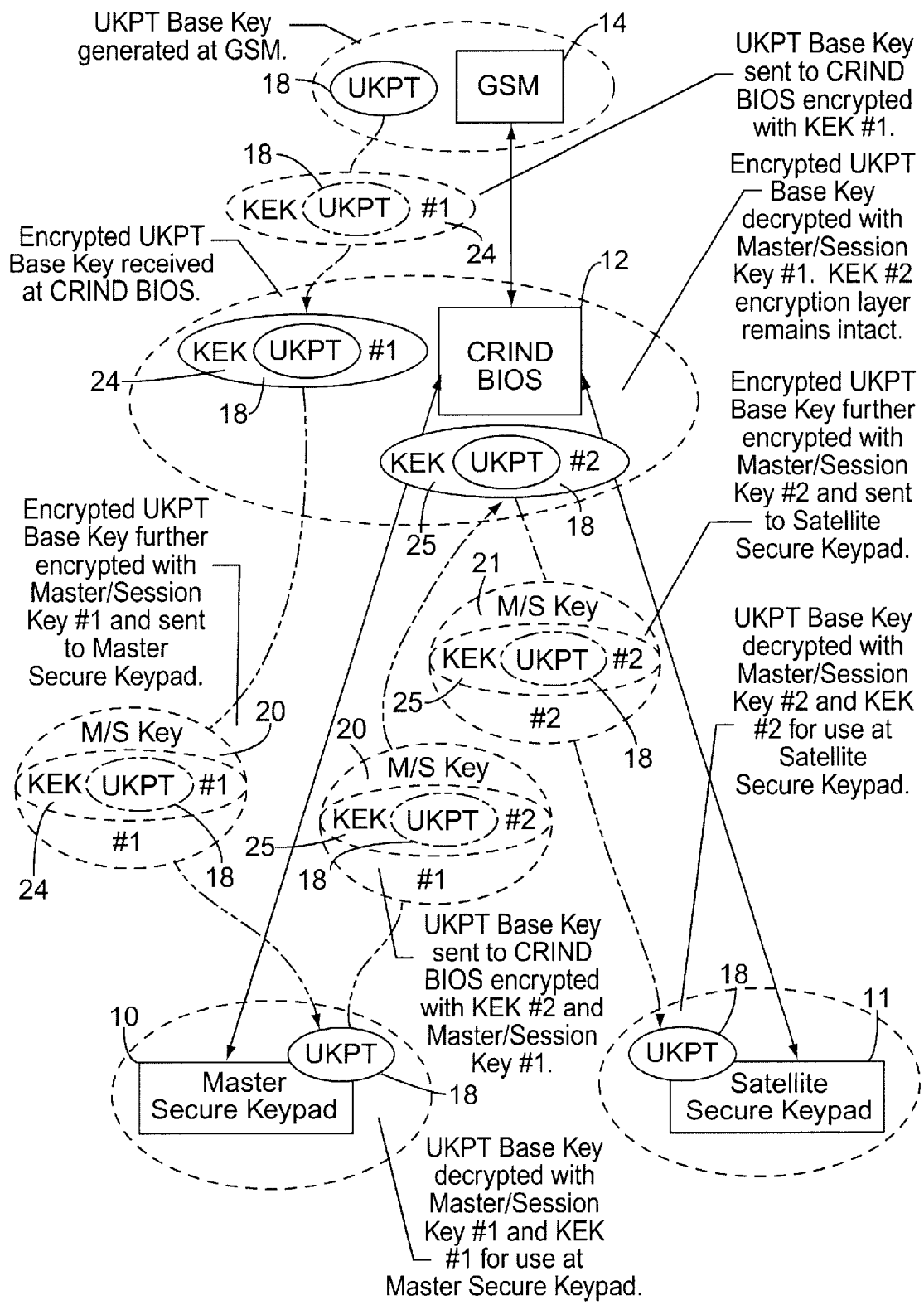
FIG. 3 is a schematic block diagram illustrating the dual secure keypad UKPT base key download process according to the first embodiment of the present invention.

As shown in FIG. 3, the GSM 14 sends the UKPT base key 18 to the CRIND® 12 BIOS encrypted under the key exchange key (KEK) 24 developed between the GSM 14 and the master secure keypad. The CRIND® 12 BIOS then relays that data to the master secure keypad 10 encrypted under the master/session key 20 the CRIND® 12 BIOS has established with that device. The master secure keypad 10 may now use this key 18 for future PIN transactions but must relay it to the satellite secure keypad 11.

To relay the UKPT base key 18 securely to the satellite secure keypad 11, the master secure keypad 10 performs an EKE session with the satellite 11 in the same manner as the GSM 14. In this way, the master secure keypad 10 acts as a virtual GSM to the satellite device 11 and establishes a second KEK 25 to be used to encrypt the UKPT base key 18. The master secure keypad now sends the encrypted UKPT base key 18 to the CRIND® 12 BIOS encrypted under M/S key #1 20. The CRIND® 12 BIOS then relays the data to the satellite secure keypad 11 encrypted under its master/session key 21 after which both layers of encryption are removed by the satellite secure keypad 11 to decode the UKPT base key 18.

Figure 4:
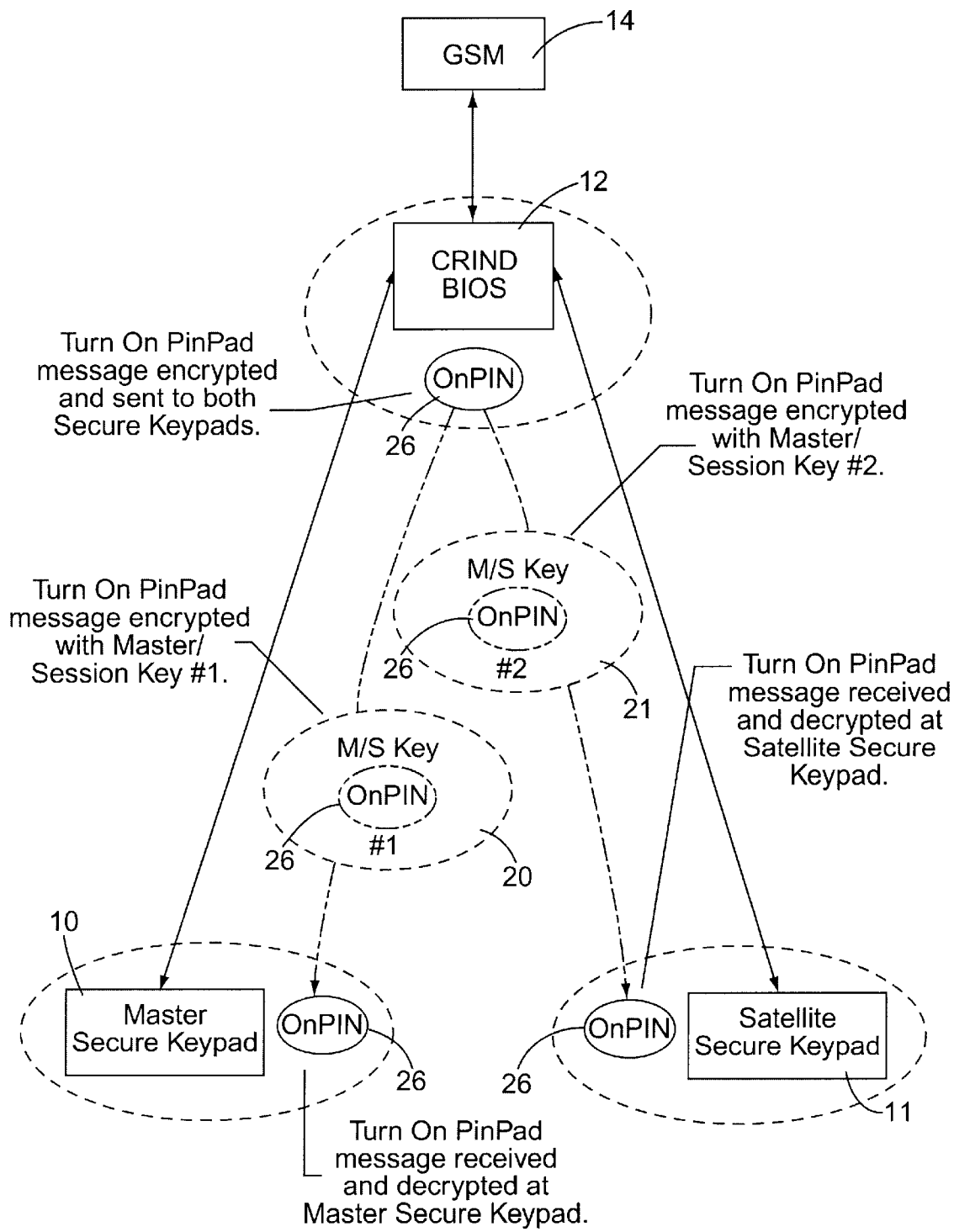
FIG. 4 is a schematic block diagram illustrating a PIN transaction initiated by the CRIND® BIOS according to the first embodiment of the present invention.

When a CRIND® application or point-of-sale device directs the CRIND® 12 BIOS to switch to PIN-entry mode, the CRIND® 12 BIOS sends an OnPIN message 26 to each secure keypad 10, 11 directing them to switch to PIN-entry mode. As with all other messages, these messages are encrypted with the appropriate key for each secure keypad. This process is shown in FIG. 4.

Each secure keypad 10, 11 then waits for the first PIN digit entered. When one of the secure keypads 10, 11 receives its first PIN digit, it directs the other secure keypad 10, 11 to ignore PIN digits until the completion of the first PIN entry. The details of this process are further described below.

Figure 5:
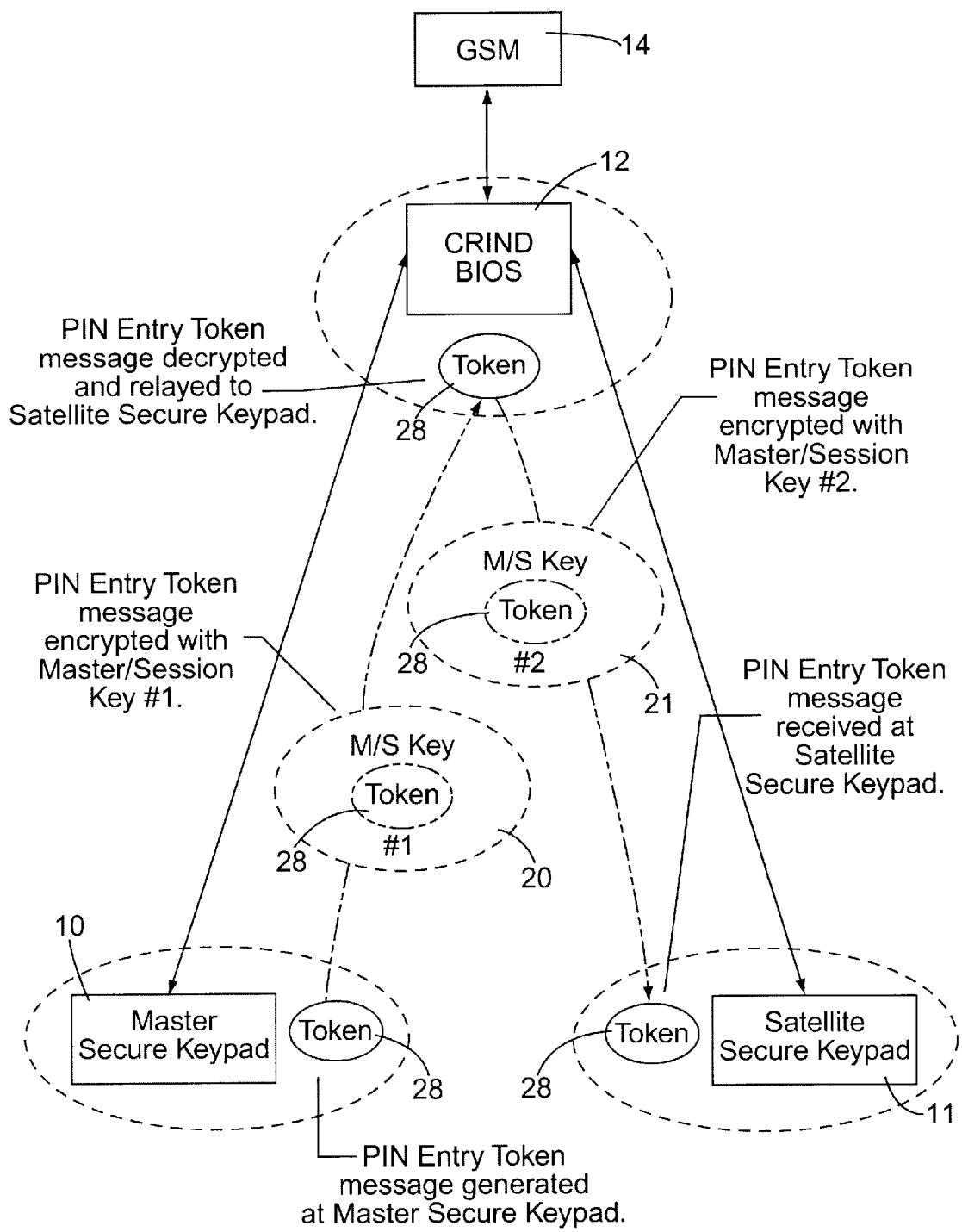
FIG. 5 is a schematic block diagram illustrating acquisition of a PIN token by the master secure keypad according to the first embodiment of the present invention.

After entering PIN-entry mode, the secure keypads await the first PIN digit. When either secure keypad 10, 11 receives this digit, it sends a message to the other secure keypad 10, 11 informing it that it has control of the transaction. Transaction control shall be referred to as a PIN entry token. Only one secure keypad can own the token and that token is relinquished only after termination of the PIN transaction. FIG. 5 shows the resulting message when the master secure keypad 10 receives the first PIN digit and takes control of the PIN transaction.

After receiving a PIN entry token 28 message, the receiving secure keypad 11 (in this example, the satellite) enters a mode where no PIN digits or control buttons (i.e., CLEAR and ENTER) are accepted. However, all other buttons are accepted and passed to the CRIND® 12 BIOS.

If the customer entering a PIN presses a digit key on both secure keypads 10, 11 before one of them acquires the PIN entry token 28, both secure keypads 10, 11 assume ownership of the token 28 and inform the other device of same. To properly place ownership of the token 28 at one secure keypad 10, 11, the master 10 and satellite 11 device handle the situation differently. If this satellite 11 receives a PIN entry token 28 notification from the master 10, it always relinquishes its token 28 to the master 10. The master 10 handles this situation by assuming ownership of the PIN entry token 28 and assuming the satellite 11 has relinquished it.

Figure 6:
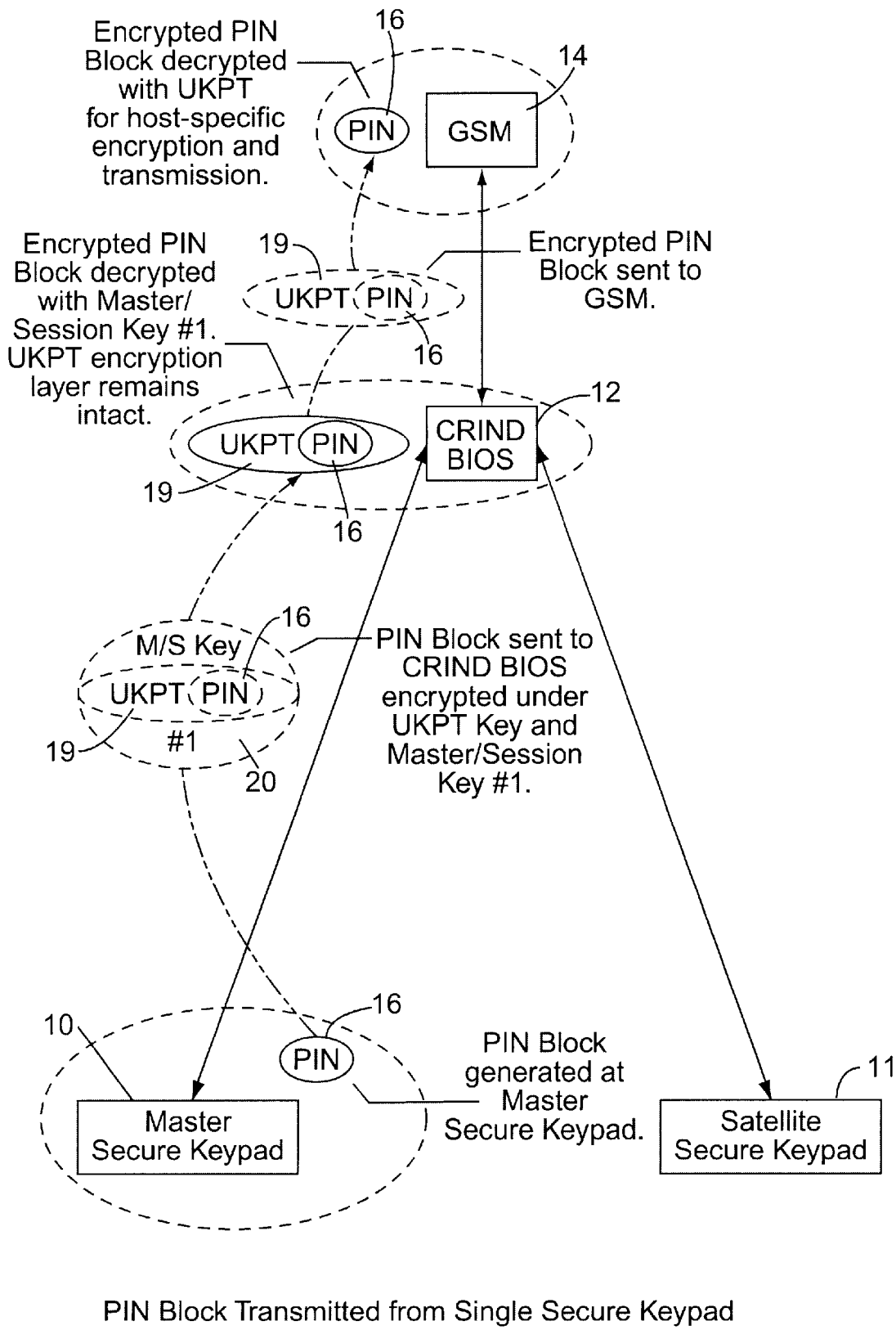
FIG. 6 is a schematic block diagram illustrating transmission of a PIN block from a master secure keypad of a two-keypad system according to the first embodiment of the present invention.

As FIG. 6 illustrates, actual transmission of the PIN Block 16 does not differ from that of a single secure keypad implementation. The PIN block 16 is encrypted with a UKPT key 19 at the secure keypad 10, then encrypted again with the master/session key 20 established between the secure keypad and the CRIND® 12 BIOS. After arriving at the CRIND® 12, the master/session key 20 encryption layer is removed and the UKPT-encrypted PIN block 16 is transmitted to the GSM 14 which decrypts it and securely transmits it to the network host according to the security specification for that particular host.

FIG. 6 demonstrates a PIN block 16 being sent from the master secure keypad. As described more fully hereinbelow, this process is identical for the satellite secure keypad 11.

Figure 7:
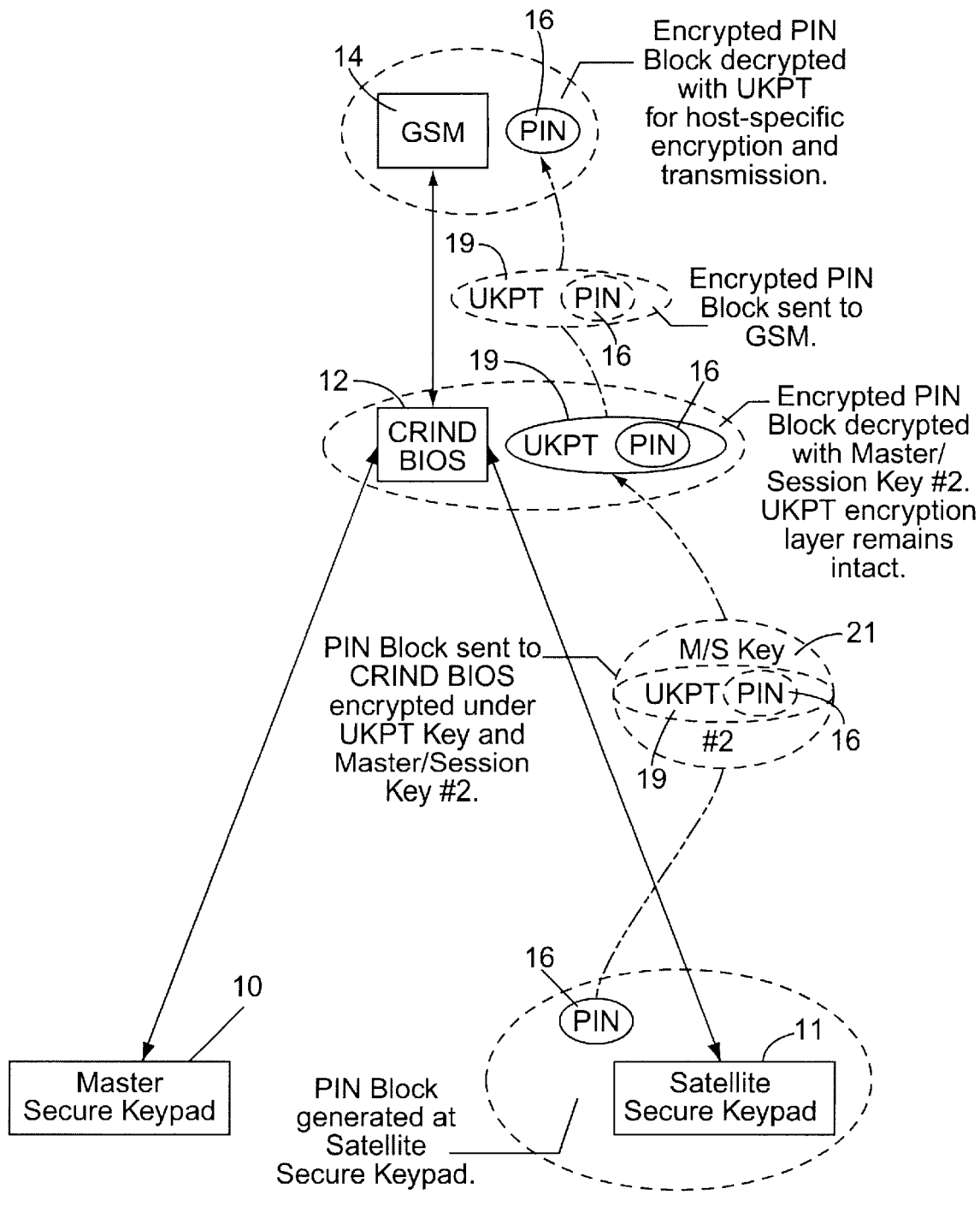
FIG. 7 is a schematic block diagram illustrating transmission of a PIN block from a satellite secure keypad according to the first embodiment of the present invention.

FIG. 7 demonstrates a PIN block 16 being sent from the satellite secure keypad 11. The sequence for this process is identical in function to that of the master secure keypad 10. The satellite 11 uses the same UKPT 19 as the master 10 would because it derives its keys from the same UKPT base key 18 as the master 10. Further, as described below, the master 10 and satellite 11 synchronize the PIN 16 transactions by informing each other of the value of their encryption counters. This allows one device to skip keys that the other device has used so that no UKPT key 19 is used more than once.

The only difference between master 10 and satellite 11 PIN block 16 transmissions is the master/session key 20, 21 used. As with all messages between secure keypads 10, 11 and CRIND® 12, the UKPT-encrypted PIN block 16 is encrypted with the master/session key 20, 21 associated with that particular secure keypad 10, 11.

Figure 8:
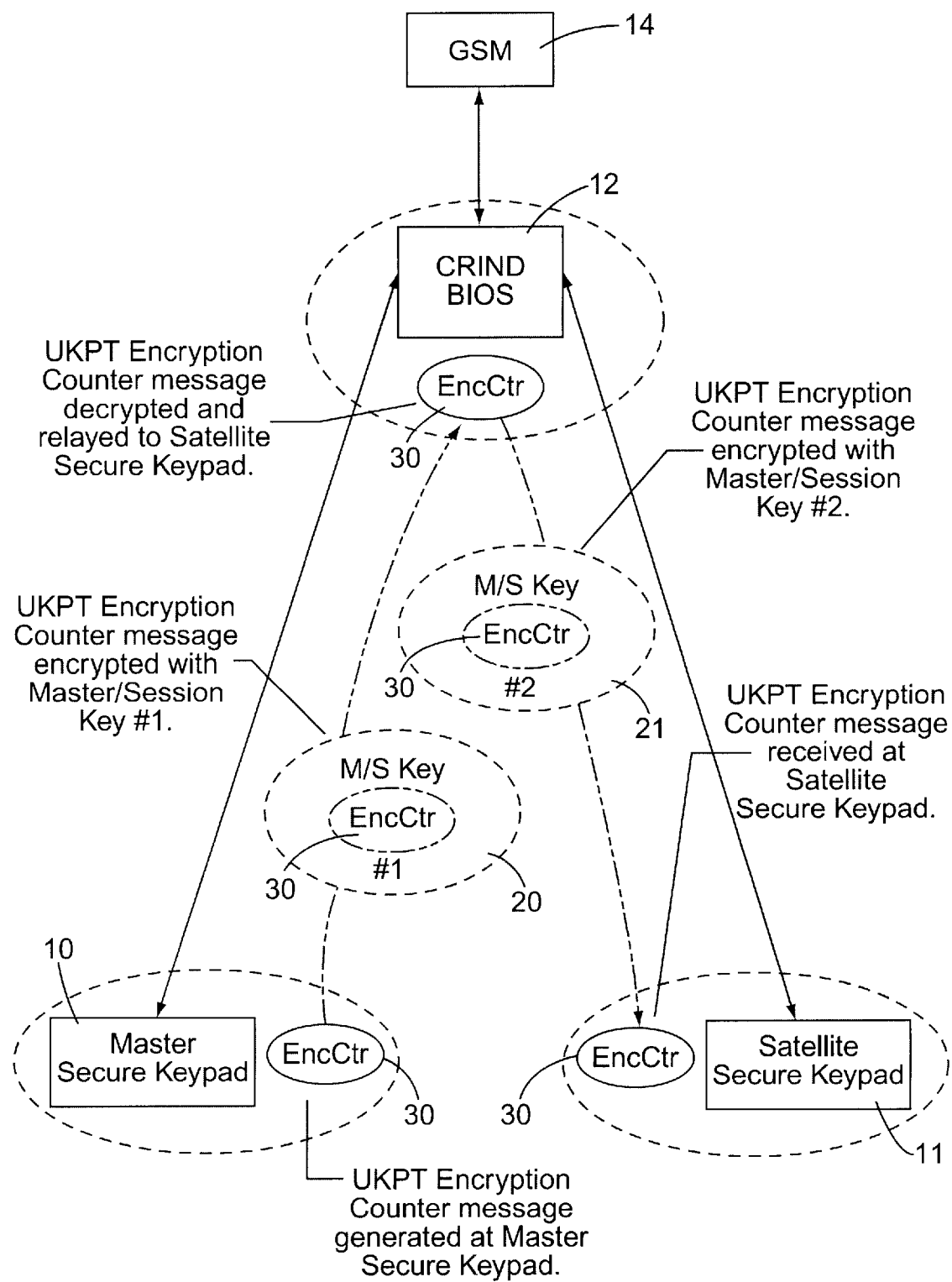
FIG. 8 is a schematic block diagram illustrating an encryption counters synchronization process according to the first embodiment of the present invention.

After completion of a PIN transaction, the UKPT key 19 used for that operation cannot be used again from that pay-point. Since two secure keypads are at a single pay-point, they cannot use the same UKPT key 19 twice. Therefore, after one secure keypad 10, 11 uses a UKPT key 19, it informs the other secure keypad 10, 11 of the value of its encryption counter 30 resulting from the transaction. This is shown in FIG. 8 as if the master secure keypad 10 had just completed a transaction. This information does not require security since this information has already been sent from the CRIND® 12 to the GSM 14 in the clear. However, the normal master/session encryption layers are still applied to this message as they are applied to any other.

After receiving an encryption counter update 30 from the other secure keypad 10, the receiving secure keypad 11 updates its UKPT count and associated tables to match the other secure keypad 10. If the receiving secure keypad 11 finds that it actually has completed more transactions than the sender 10 (an exception condition), it sends its own encryption counter information 30 to re-synchronize the secure keypads 10, 11 into agreement.

This method of synchronization can also be used as a recovery mechanism when one secure keypad 10, 11 loses its UKPT data without other disruptions in the system (e.g., a secure keypad loses power independent of the CRIND®). With two secure keypads 10, 11 sharing UKPT data, one can be used to recover the other.

The present invention need not be restricted to two secure keypads at a single pay-point as other keypads can be appended as additional satellites. This may result in multiple EKE operations performed between the master and all satellites, a more complicated PIN entry arbitration scheme in which the master would arbitrate between competing satellites, and additional steps in UKPT key synchronization in which the master would broadcast the highest counter value reported from the satellites.

The present invention is not limited to the preferred embodiment illustrated in FIGS. 1–8. Two alternate embodiments may be used individually or in combination with one another to best fit the needs of any implementation of multiple secure keypad devices at a single pay point. The first alternate embodiment is a two-level architecture with one master secure keypad on the first level with multiple satellite secure keypads on the second level. This architecture eliminates the need for an intercessor device like the CRIND® 12 BIOS described with respect to FIGS. 1–8. However, the concept of the invention is preserved in that multiple secure keypads may reside at a single pay-point without affecting the site security module. To illustrate this approach to the master/satellite secure keypad invention, the following subsections show an n-keypad implementation in which satellite keypad number "n" represents a similar approach for keypad numbers 2–n.

Message-Level Interface

Figure 9:
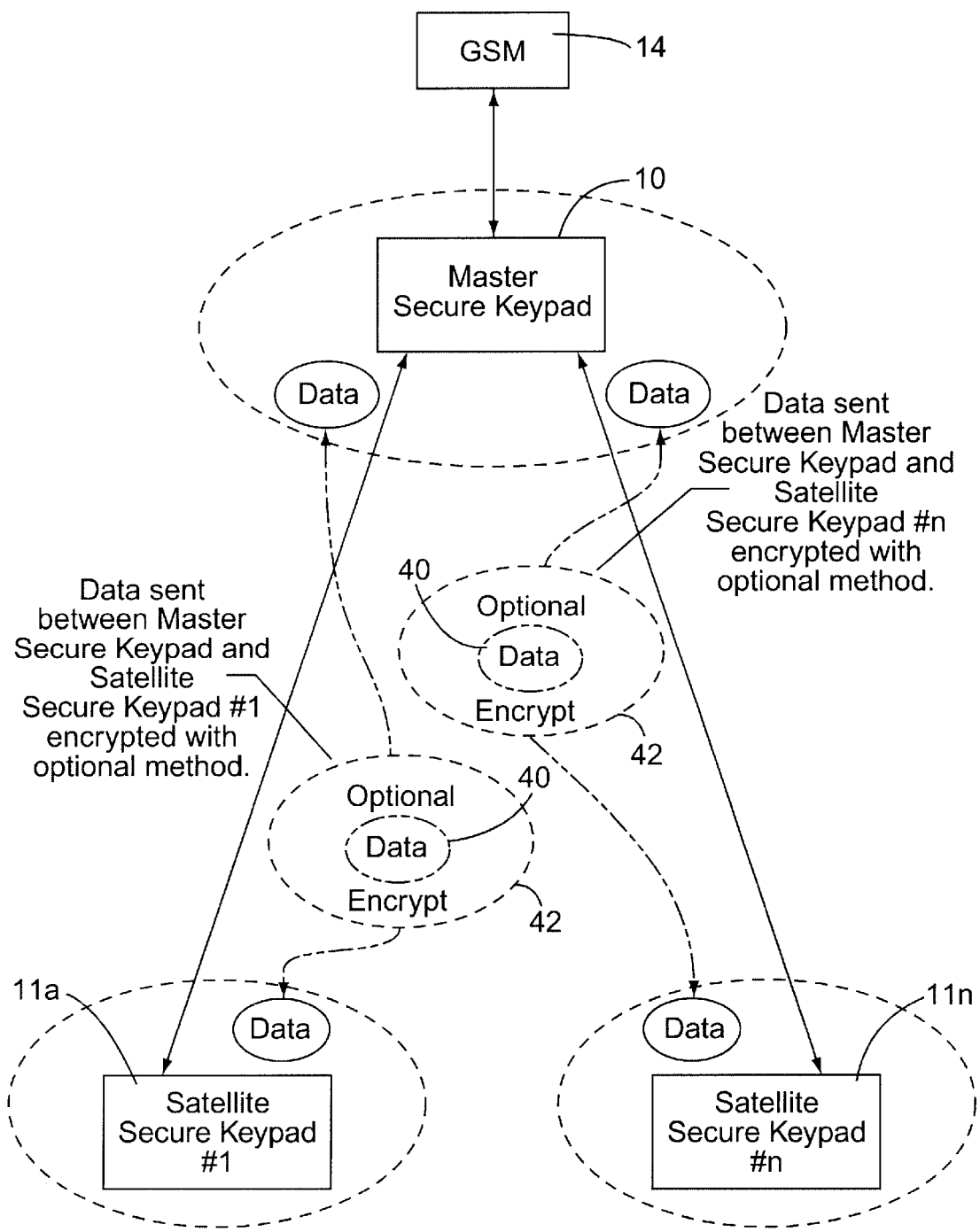
FIG. 9 is a schematic block diagram illustrating data flow between secure keypad devices according to a second embodiment of the present invention.

FIG. 9 shows the logical configuration of the two-level secure keypad solution without an intercessor device, such as the CRIND® 12 BIOS illustrated in FIGS. 1–8.

Since there is no need for an intercessor device between secure keypad units, the master and satellites may be directly connected, as allowed by the implementation.

In order to relay data from one secure keypad device to another, a master secure keypad 10 may perform a security derivation sequence with each satellite secure keypad in order to establish the ability for message-level encryption. Once a safe encryption level has been established, the master secure keypad device 10 and the satellite secure keypad devices 11a–11n may send messages 40 to each other under an encryption layer 42.

UKPT Base Key Transmission

One exemplary existing site configuration for debit assumes one PIN-pad device per fueling position. In order to maintain full compatibility with this architecture, the multiple secure keypad system illustrated in FIG. 10 relays the UKPT base key 18 from the master secure keypad 10 to the satellite secure keypad devices 11a–11n in the manner shown in FIG. 10. This method allows all secure keypad devices to use the same UKPT key sequence in a manner invisible to the GSM.

Figure 10:
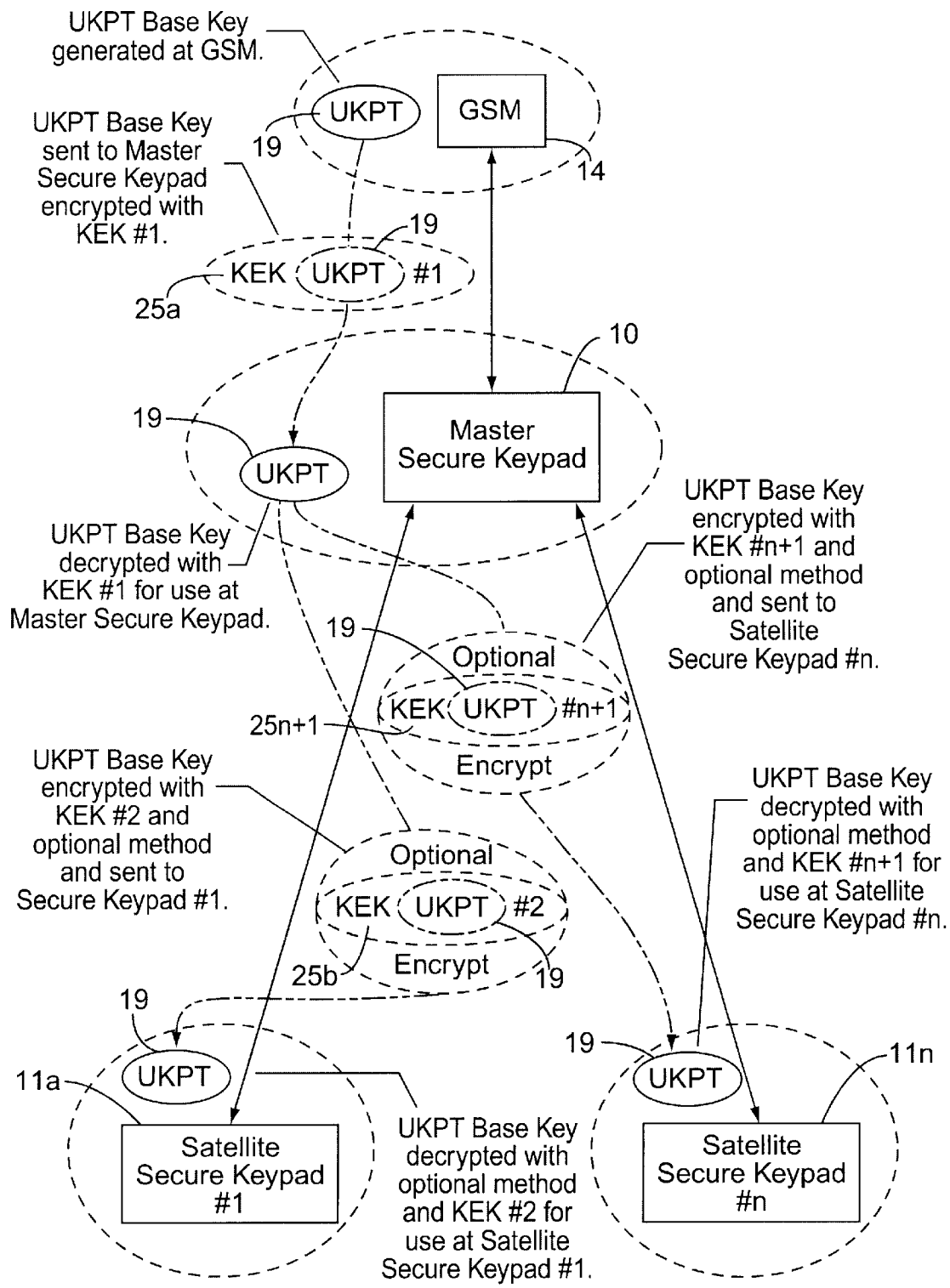
FIG. 10 is a schematic block diagram illustrating transmission of a UKPT key from a master secure keypad to a plurality of satellite secure keypads according to the second embodiment of the present invention.

As shown in FIG. 10, the GSM 14 sends the UKPT base key 18 to the master secure keypad encrypted under the KEK 25a developed between the GSM and the master secure keypad 10. The master secure keypad may now use this key for future PIN transactions but must relay it to the satellite secure keypads 11a–11n.

In order to relay the UKPT base key 18 securely to the satellite secure keypad devices 11a–11n, the master secure keypad performs an EKE session with the satellites in the same manner as the GSM 14. In this way, the master device acts as a virtual GSM to the satellite devices and establishes additional KEKs 25b–25n+1 to be used to encrypt the UKPT base key 18. The master now sends the encrypted UKPT base key 18 to the satellite secure keypad devices 11a–11n encrypted with optional methods, after which both layers of encryption are removed by each satellite secure keypad to decode the UKPT base key 18.

Initiating a PIN Transaction

Figure 11:
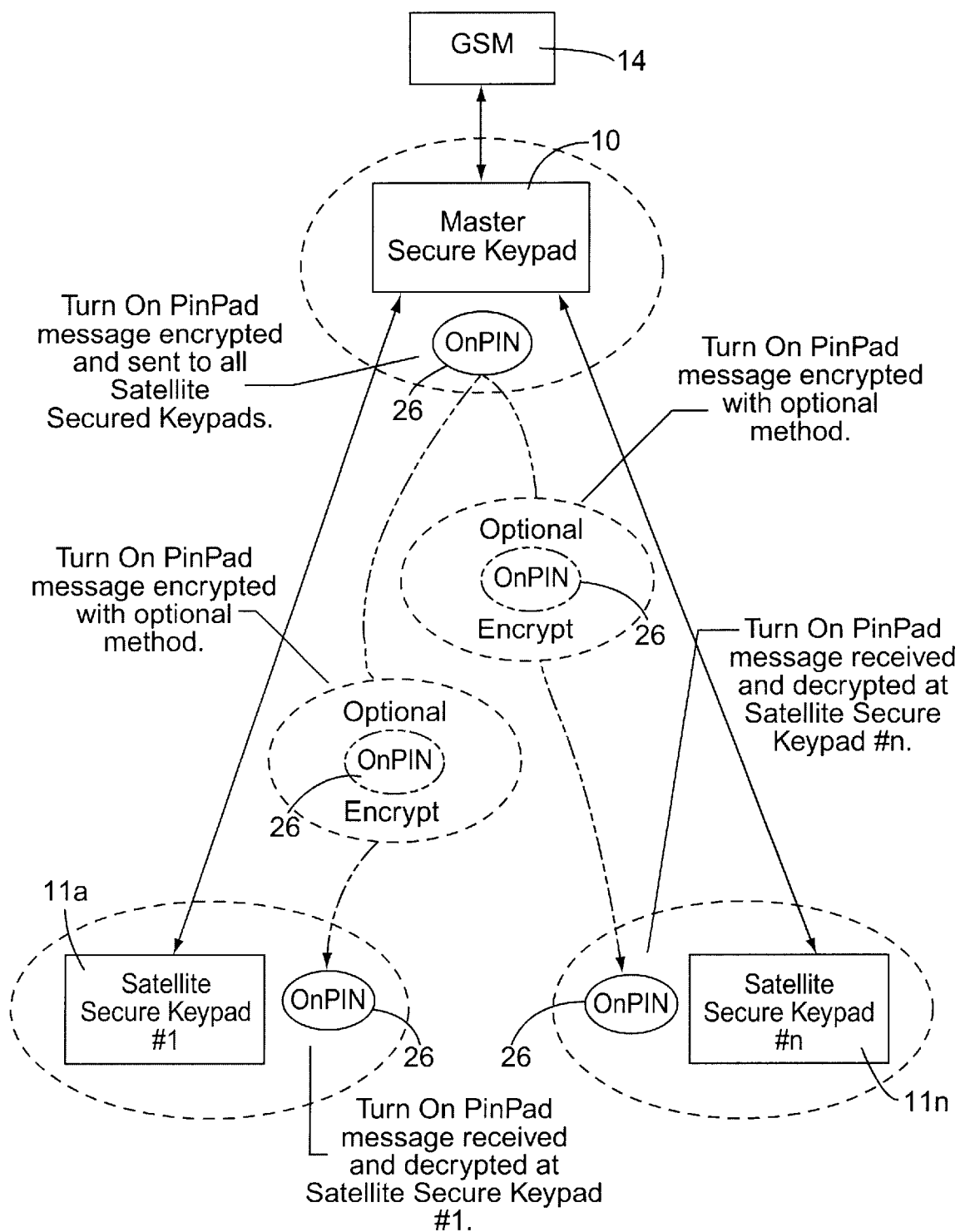
FIG. 11 is a schematic block diagram illustrating the transfer of PIN-entry mode control information between a master secure keypad and a plurality of satellite secure keypads according to the second embodiment of the present invention.

Referring to FIG. 11, when the Application directs the master secure keypad 10 to switch to PIN-entry mode, the master secure keypad 10 sends an OnPIN message 26 to each satellite secure keypad device 11a–11n directing the satellite secure keypad devices to switch to PIN-entry mode. As with all other messages, these messages are encrypted with the appropriate method for each master secure keypad 10. This process is shown in FIG. 11.

In FIG. 11, each secure keypad then waits for the first PIN digit entered. When one of the secure keypads receives its first PIN digit, it directs the other secure keypads to ignore PIN digits until the completion of the PIN entry. The details of this process are described with regard to FIG. 12.

PIN Entry Arbitration

Figure 12:
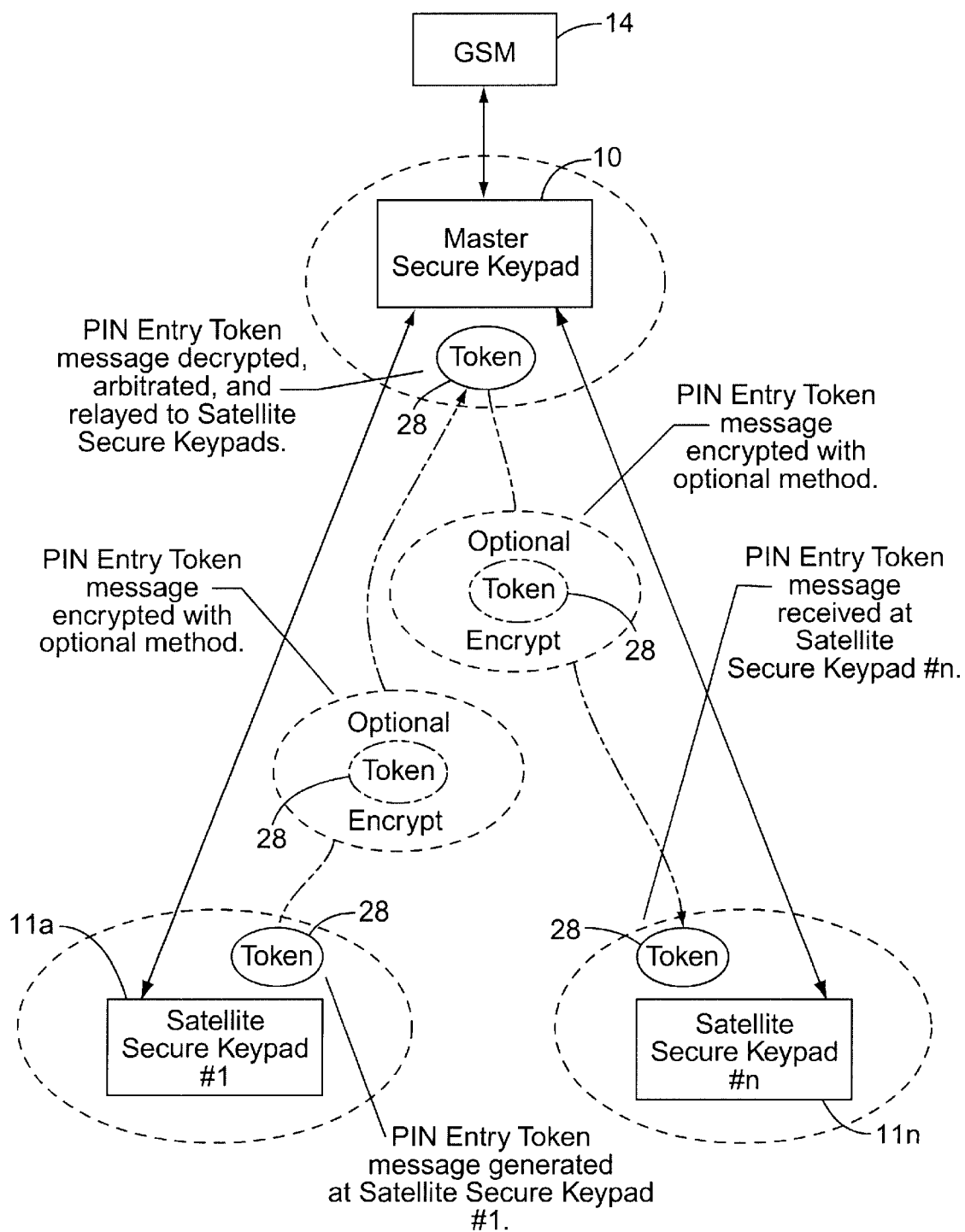
FIG. 12 is a schematic block diagram illustrating PIN-entry arbitration between satellite secure keypads according to the second embodiment of the present invention.

After entering PIN-entry mode, the secure keypads await the first PIN digit. When any secure keypad receives this digit, it sends a message to the other secure keypad informing them that it has control of the transaction. This transaction control shall be referred to as a PIN entry token. Only one secure keypad can own the token 28 and that token 28 is relinquished only after termination of the PIN transaction. FIG. 12 shows the resulting message when satellite secure keypad 11a receives the first PIN digit and takes control of the PIN transaction.

After receiving a PIN entry token message, the receiving secure keypad (in this example, the master and all other satellites) enters a mode where no PIN digits or control buttons (i.e. CLEAR and ENTER) are accepted. However, all other buttons are accepted and passed on to the pay point.

If the customer entering a PIN presses a digit key on multiple secure keypad devices before one of them acquires the PIN entry token 28, those secure keypad devices assume ownership of the token 28 and inform the other devices of this through the master. To properly place ownership of the token at one secure keypad, the master and satellite devices handle this situation differently. If the satellites receive a PIN entry token 28 notification from the master, they will always relinquish the token 28 to the master. The master will handle this situation by assuming ownership of the PIN entry token 28 and assuming the desired satellites have relinquished the token 28. The master may then allow one satellite to retain the token 28, if desired.

PIN Block Transmission from the Master Secure Keypad

Figure 13:
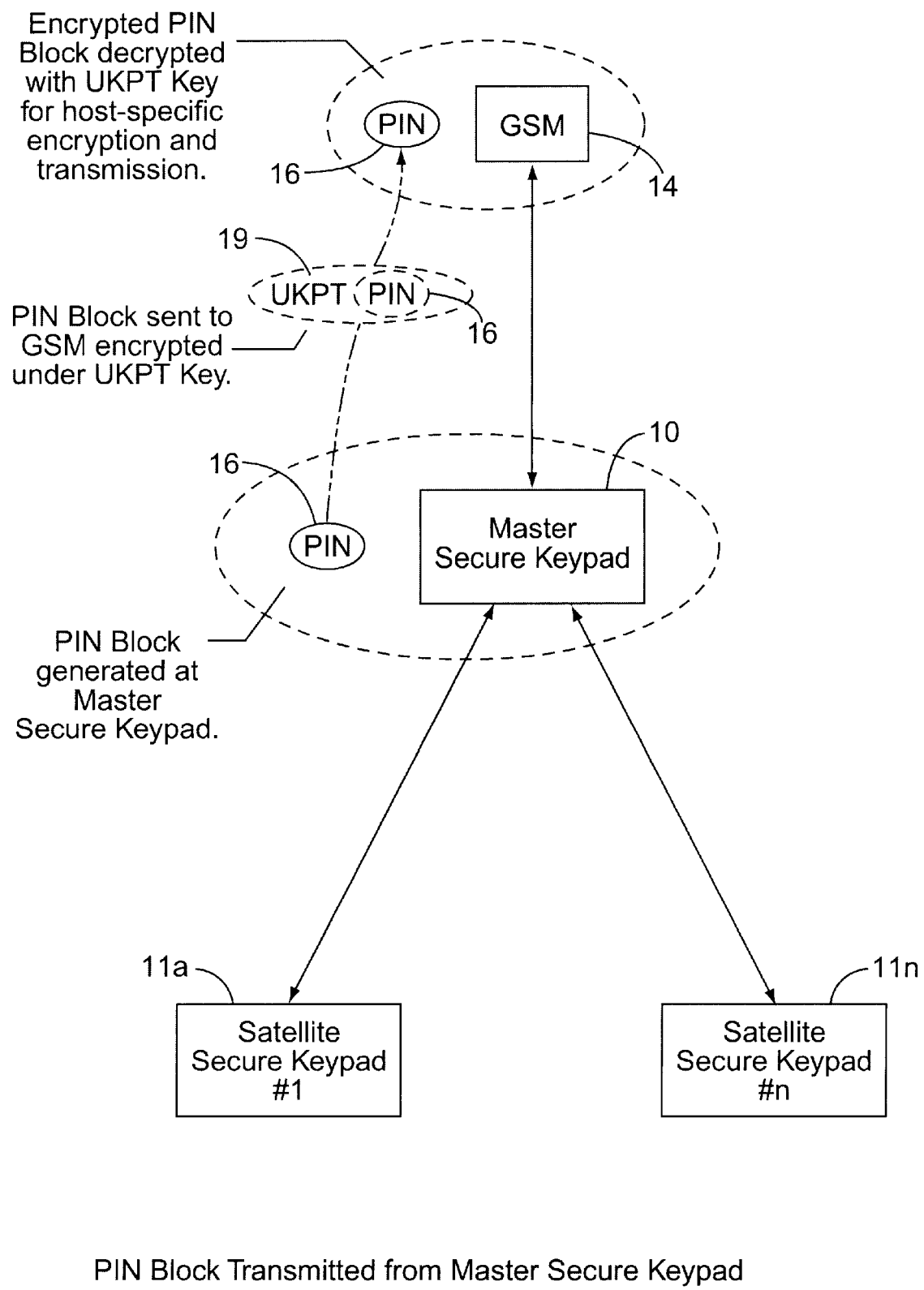
FIG. 13 is a schematic block diagram illustrating transmission of a PIN block from a master secure keypad to a security module according to the second embodiment of the present invention.

FIG. 13 illustrates the transmission of the PIN block 16 from the master secure keypad 10. The PIN block 16 is encrypted with a UKPT key 19 at the master secure keypad 10 and transmitted to the GSM 14 which decrypts with the UKPT key 19 and securely transmits the PIN block 16 to the network host according to the security specification for that particular host.

PIN Block Transmission from Satellite Secure Keypad

Figure 14:
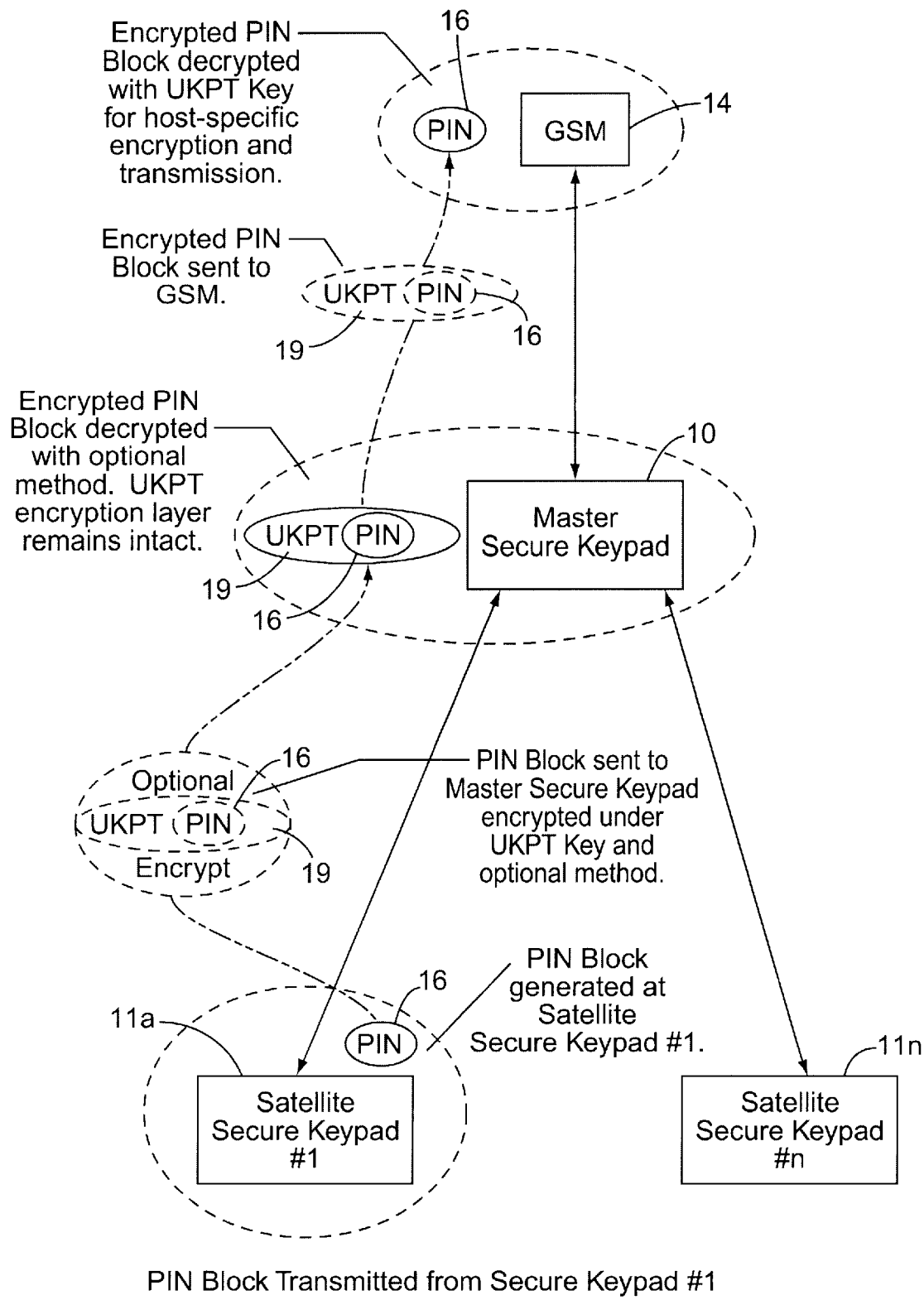
FIG. 14 is a schematic block diagram illustrating transfer of a PIN block from a satellite secure keypad to a master secure keypad and from the master secure keypad to a security module according to the second embodiment of the present invention.

FIG. 14 demonstrates a PIN block being sent from the first satellite secure keypad 11a. The satellite 11a uses the same UKPT key 19 as the master 10 because it derives its keys from the same UKPT base key 18 as the master 10. Further, the master 10 and satellites 11a–11n synchronize their PIN transactions by informing each other of the value of their encryption encounters. This allows each device to skip keys that the other devices have used so that no UKPT key 19 is used more than once.

FIG. 14 demonstrates a PIN block 16 being sent from one satellite secure keypad. As the next section will show, this process is identical for all satellite secure keypad devices.

PIN Block Transmission from other Satellite Secure Keypad Devices

Figure 15:
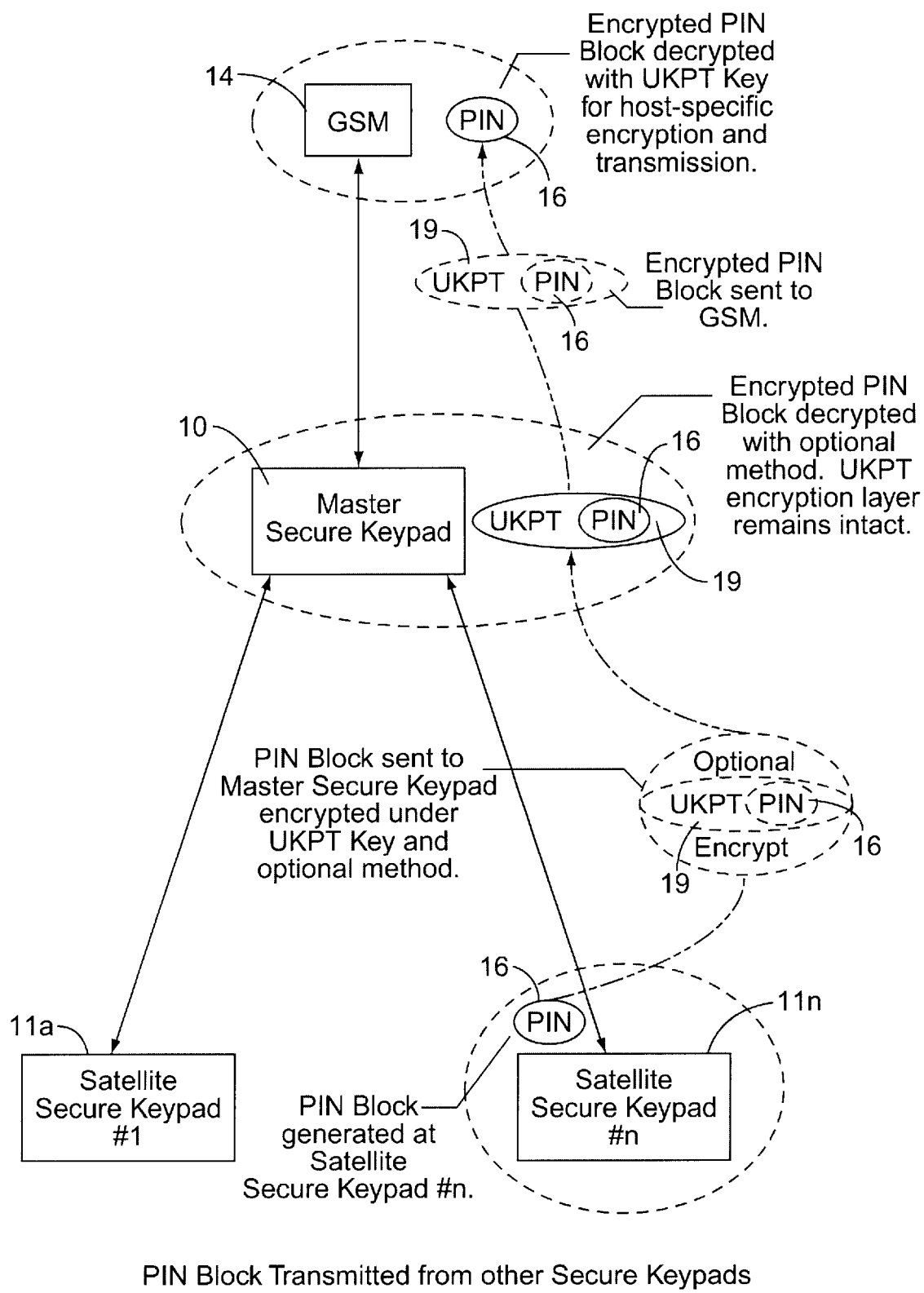
FIG. 15 is a schematic block diagram illustrating transfer of a PIN block from another secure satellite secure keypad to the master secure keypad and from the master secure keypad to the security module according to the second embodiment of the present invention.

FIG. 15 demonstrates a PIN block 16 being sent from other satellite secure keypad devices other than the satellite secure keypad 11a. The sequence for this process is identical in function to that of the first satellite secure keypad 11a. Each satellite uses the same UKPT 19 as all the others because they all derive their keys from the same UKPT base key 18 as the master 10.

UKPT Key Synchronization Between Secure Keypad Devices

Figure 16:
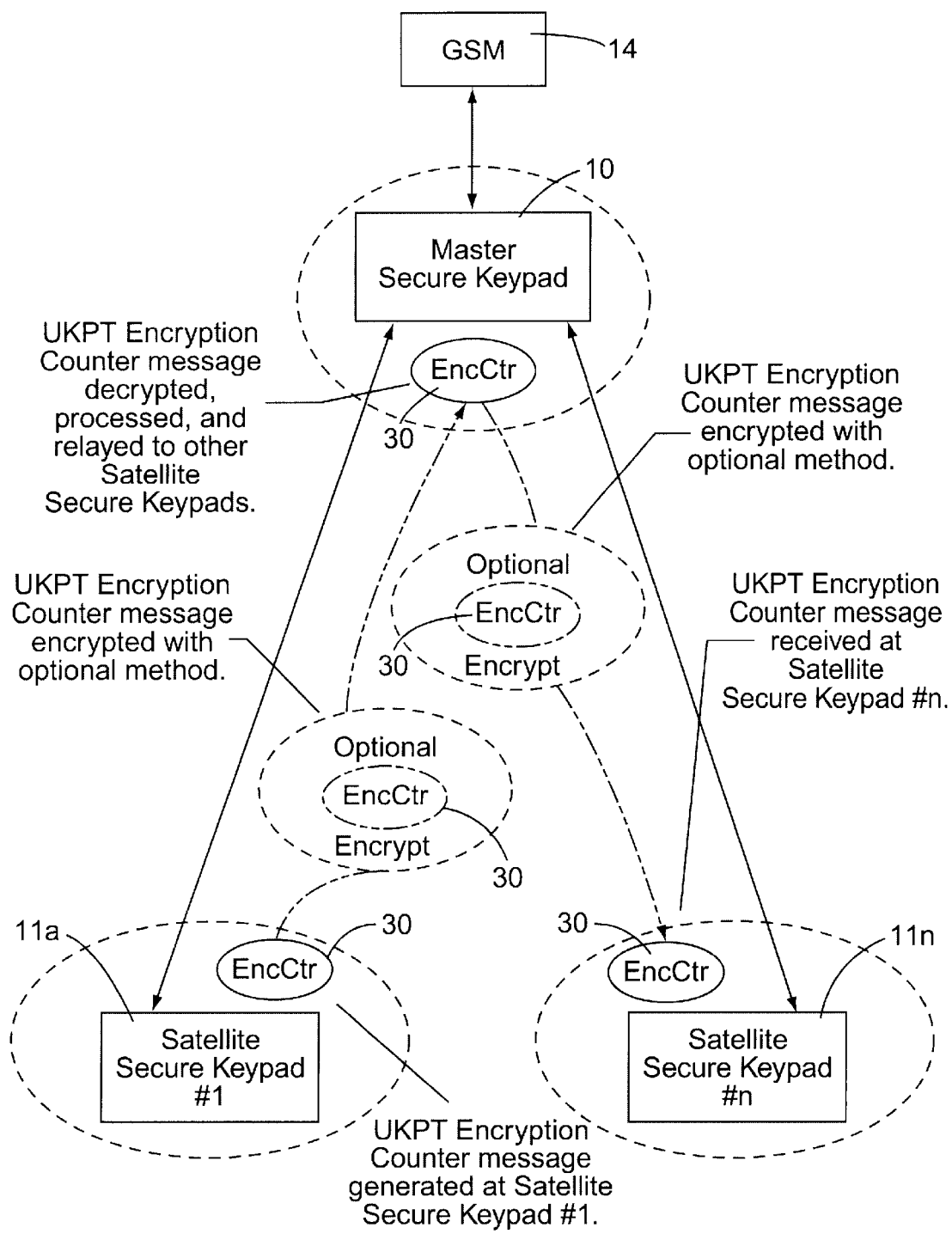
FIG. 16 is a schematic block diagram illustrating UKPT key synchronization-between secure keypad devices according to the second embodiment of the present invention.

After completion of a PIN transaction, the UKPT key 19 used for that operation cannot be used again from that pay-point. Since multiple secure keypad devices are at one pay-point, they must not use the same UKPT key 19 twice. Therefore, after one secure keypad uses a UKPT key 19, it informs the others of the value of its encryption counter resulting from the transaction. This is shown in FIG. 16 as if the first satellite secure keypad 11a had just completed the transaction. This information does not require security. However, the normal encryption layers may still be applied to this message as they are applied to any other.

After receiving an encryption counter update from another secure keypad device, the receiving secure keypad device updates its UKPT count and associated tables to match the other secure keypad devices. If the receiving secure keypad finds that it actually has completed more transactions than the sender (this is an exception condition), it sends its own encryption counter information to resynchronize all secure keypad devices into agreement.

Third Embodiment

According to another embodiment, the present invention may include an n+1-level architecture with one master secure keypad on the first level above a series of satellite secure keypads, each on their own level. Like the embodiment described with respect to FIGS. 9–16, this architecture eliminates the need for an intercessor device like the CRIND® BIOS described with respect to FIGS. 1–8. However, the concept of the invention is preserved in that multiple secure keypads may reside at a single pay-point without affecting the site security module. To illustrate this approach to the master/satellite secure keypad invention, the following subsections show an n-keypad implementation in which satellite keypad number 'n' represents a similar approach for keypad numbers 2-n.

Message-Level Interface

Figure 17:
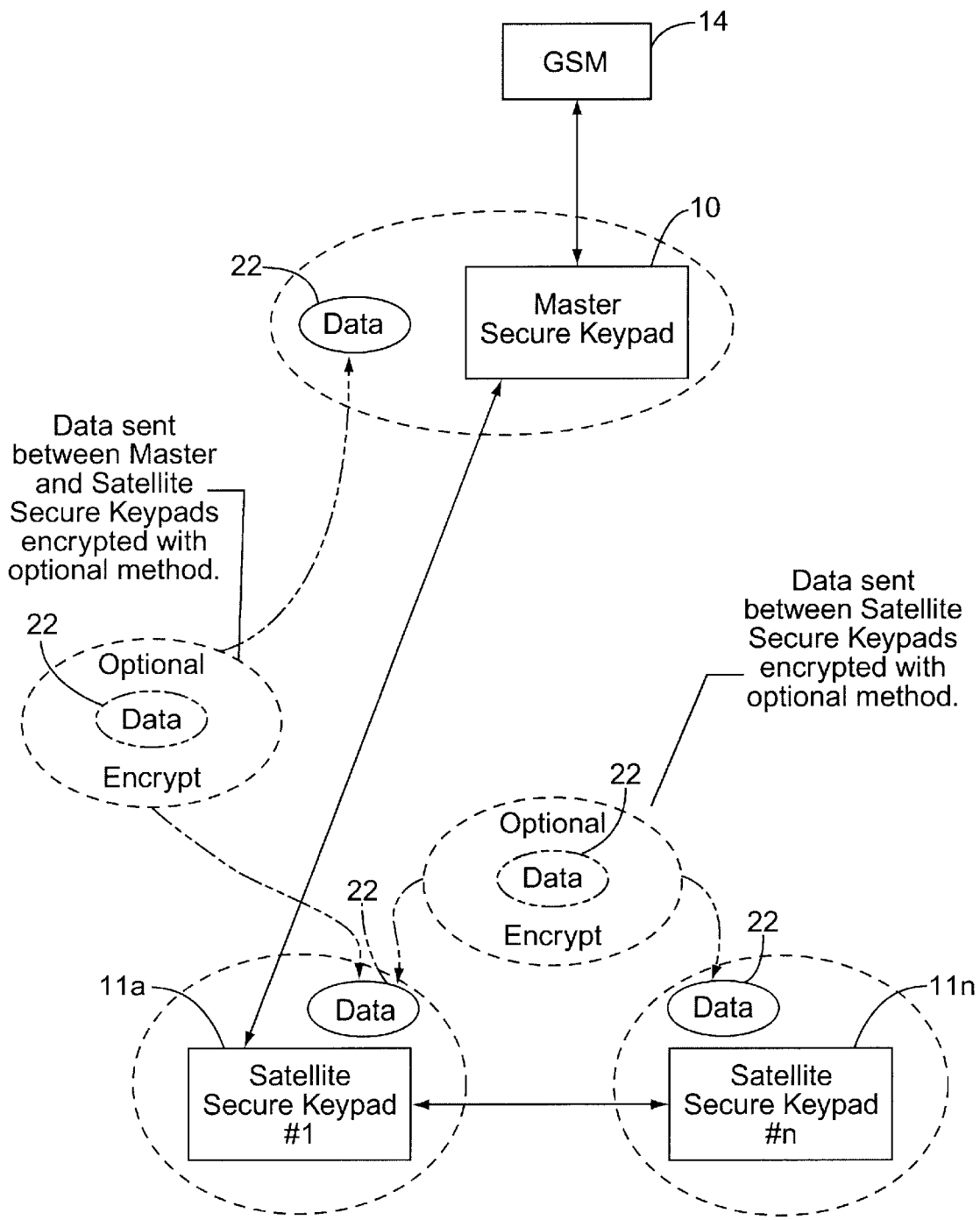
FIG. 17 is a schematic block diagram illustrating data flow between parent secure keypads and child secure keypads according to a third embodiment of the present invention.

FIG. 17 shows the logical configuration of the n+1-level secure keypad solution. In this configuration each secure keypad device can have a parent and child secure keypad. FIG. 17 illustrates that the master has no parent secure keypad and secure keypad #n has no child secure keypad. As used herein, the phrase "parent secure keypad" refers to a secure keypad connected in series with another secure keypad of a higher, e.g., further from the GSM, level. The phrase "child secure keypad" refers to a secure keypad connected in series with another secure keypad of a lower, e.g., closer to the GSM, level. For example, in FIG. 17, the satellite secure keypad 11a is a child of master secure keypad 10 and a parent of the satellite secure keypad 11n.

Since there is no need for an intercessor device between secure keypad units, the master and satellites may be directly connected as allowed by the implementation.

In order to relay data from one secure keypad device to another, the parent secure keypad may perform a security derivation sequence with its child in order to establish the ability for message-level encryption. Once a safe encryption level has been established, the secure keypad devices may send messages to each other under an encryption layer.

UKPT Base Key Transmission

One exemplary existing site configuration for debit assumes one PIN-pad device per fueling position. In order to maintain full compatibility with this architecture, the multiple secure keypad system relays the UKPT base key from the master secure keypad to the satellite secure keypad devices in the manner shown in FIG. 18. This method allows all secure keypad devices to use the same UKPT key sequence in a manner invisible to the GSM.

Figure 18:
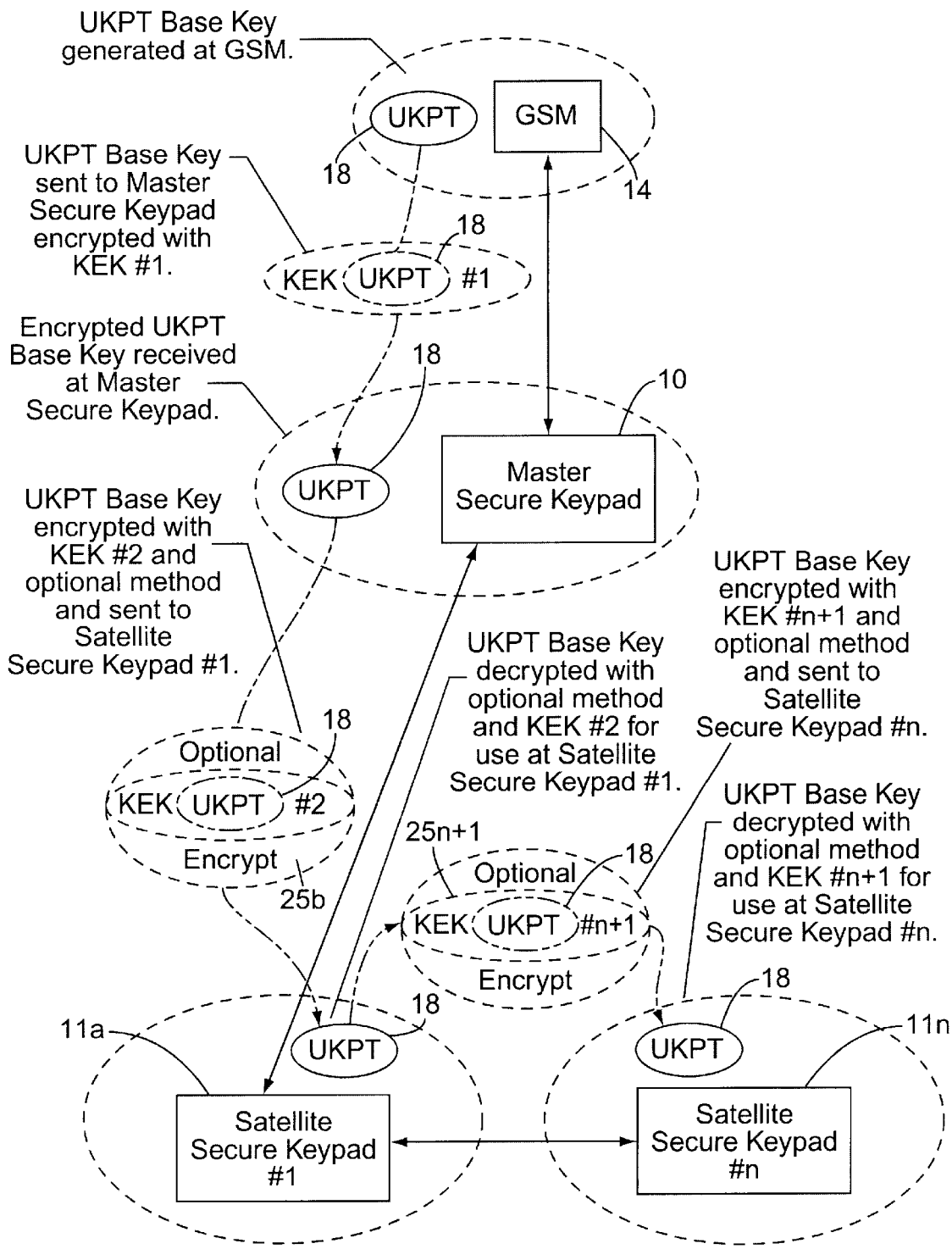
FIG. 18 is a schematic block diagram illustrating the UKPT base key download process according to the third embodiment of the present invention.

As shown in FIG. 18, the GSM 14 sends the UKPT base key 18 to the master secure keypad 10 encrypted under the KEK 25a developed between the GSM 14 and the master secure keypad 10. The master secure keypad 10 may now use this key 18 for future PIN transactions but must relay it now to the satellites.

To relay the UKPT base key 18 securely to the satellite secure keypad devices, each parent secure keypad performs an EKE session with its child in the same manner as the GSM 14. In this way, each parent device acts as a virtual GSM 14 to each child device and establishes additional KEKs 25b–25n+1 to be used to encrypt the UKPT base key 18. The master 10 now sends the encrypted UKPT base key 18 to its child 11a encrypted with optional methods after which both layers of encryption are removed by the child to decode the UKPT base key 18 and relay the key to subsequent children.

Initiating a PIN Transaction

Figure 19:
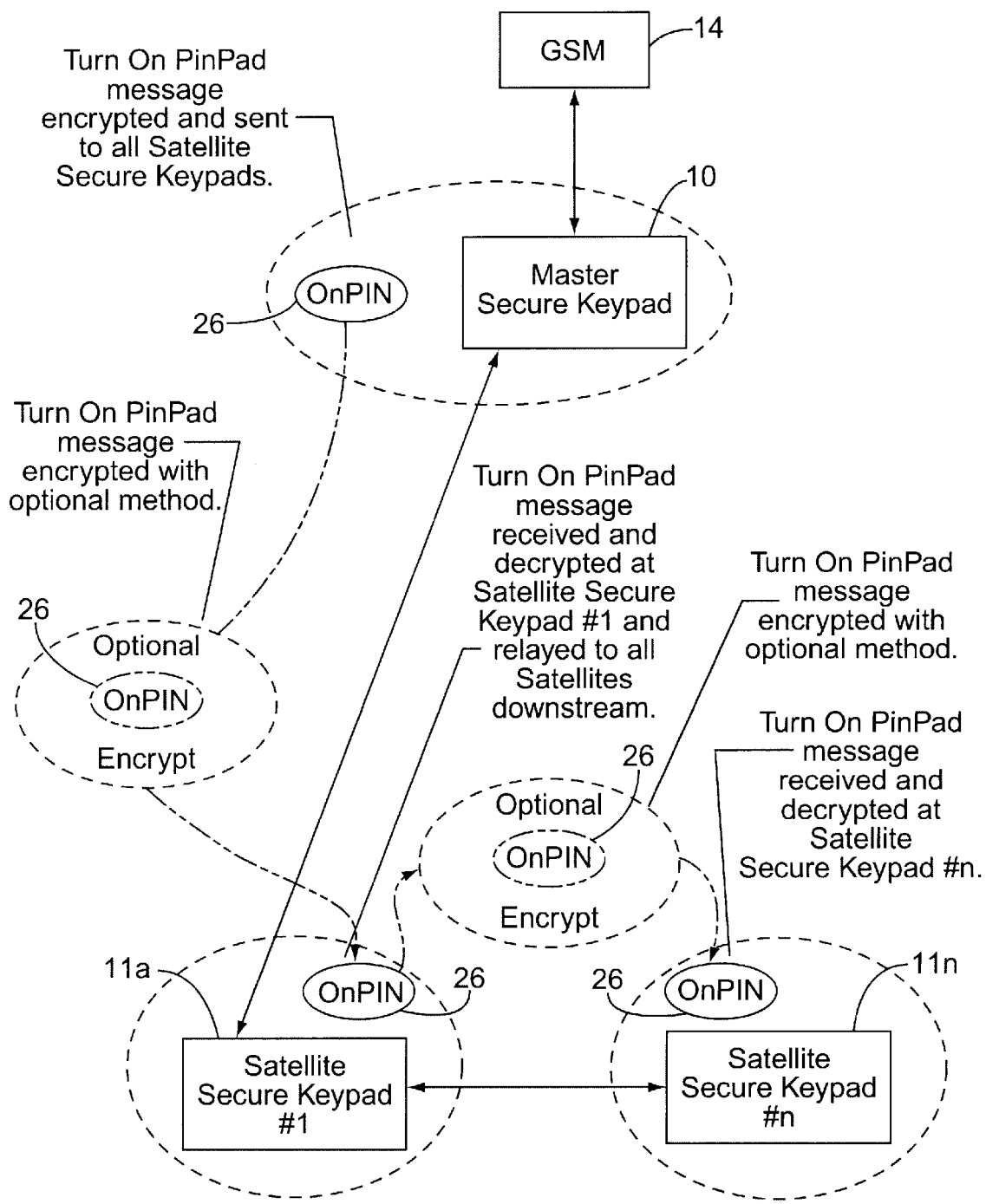
FIG. 19 is a schematic block diagram illustrating transmission of a PIN-entry mode message between secure keypads according to the third embodiment of the present invention.

Referring to FIG. 19, when an Application directs the master secure keypad device 10 to switch to PIN-entry mode, the master secure keypad 10 sends an OnPIN message 26 to a first satellite device 11a directing the first satellite device 11a to switch to PIN-entry mode. The first satellite secure keypad device 11a decrypts the OnPIN message 26, re-encrypts the OnPIN message 26, and transmits the OnPIN message 26 to a child satellite device immediately downstream. This process is shown in FIG. 19.

Each secure keypad then waits for the first PIN digit entered. When one of the secure keypad devices receives its first PIN digit, it directs the other secure keypad to ignore PIN digits until the completion of the PIN entry. The details of this process are described in the next section.

PIN Entry Arbitration

Figure 20:
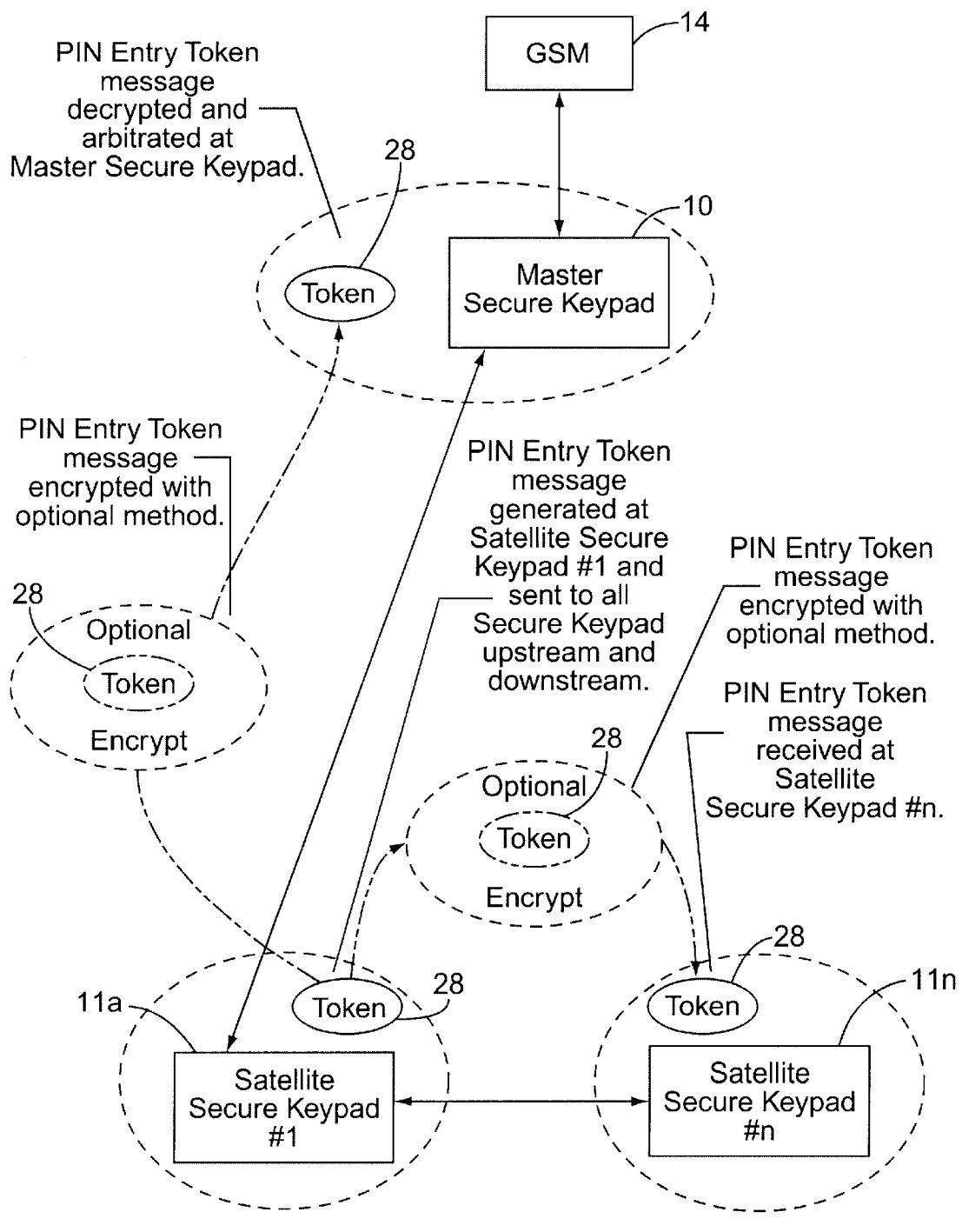
FIG. 20 is a schematic block diagram illustrating PIN-entry arbitration between secure keypad devices according to the third embodiment of the present invention.

Referring to FIG. 20, after entering PIN-entry mode, the secure keypad devices await the first PIN digit. When any secure keypad receives this digit, it sends a message to the other secure keypad devices informing them that it has control of the transaction. This transaction control shall be referred to as a PIN entry token. Only one secure keypad can own the token 28 and that token 28 is relinquished only after termination of the PIN transaction. FIG. 20 shows the resulting message when the first satellite secure keypad 11a receives the first PIN digit and takes control of the PIN transaction.

After receiving a PIN entry token message, the receiving secure keypad (in this example, the master and all other satellites) enters a mode where no PIN digits or control buttons (i.e. CLEAR and ENTER) are accepted. However, all other buttons are accepted and passed on to the pay point.

If the customer entering a PIN presses a digit key on multiple secure keypad devices before one of them acquires the PIN entry token 28, each device assumes ownership of the token 28 and informs the other devices of this through the parent-child chain. To properly place ownership of the token 28 at one secure keypad, the parent and child devices handle this situation differently. If the children receive a PIN entry token notification from the parent, they will always relinquish the token to the parent. The parent will handle this situation by assuming ownership of the PIN entry token and assuming its children have relinquished the PIN entry token. A child may then be required to relinquish its token to its own parent secure keypad device.

PIN Block Transmission from the Master Secure Keypad

Figure 21:
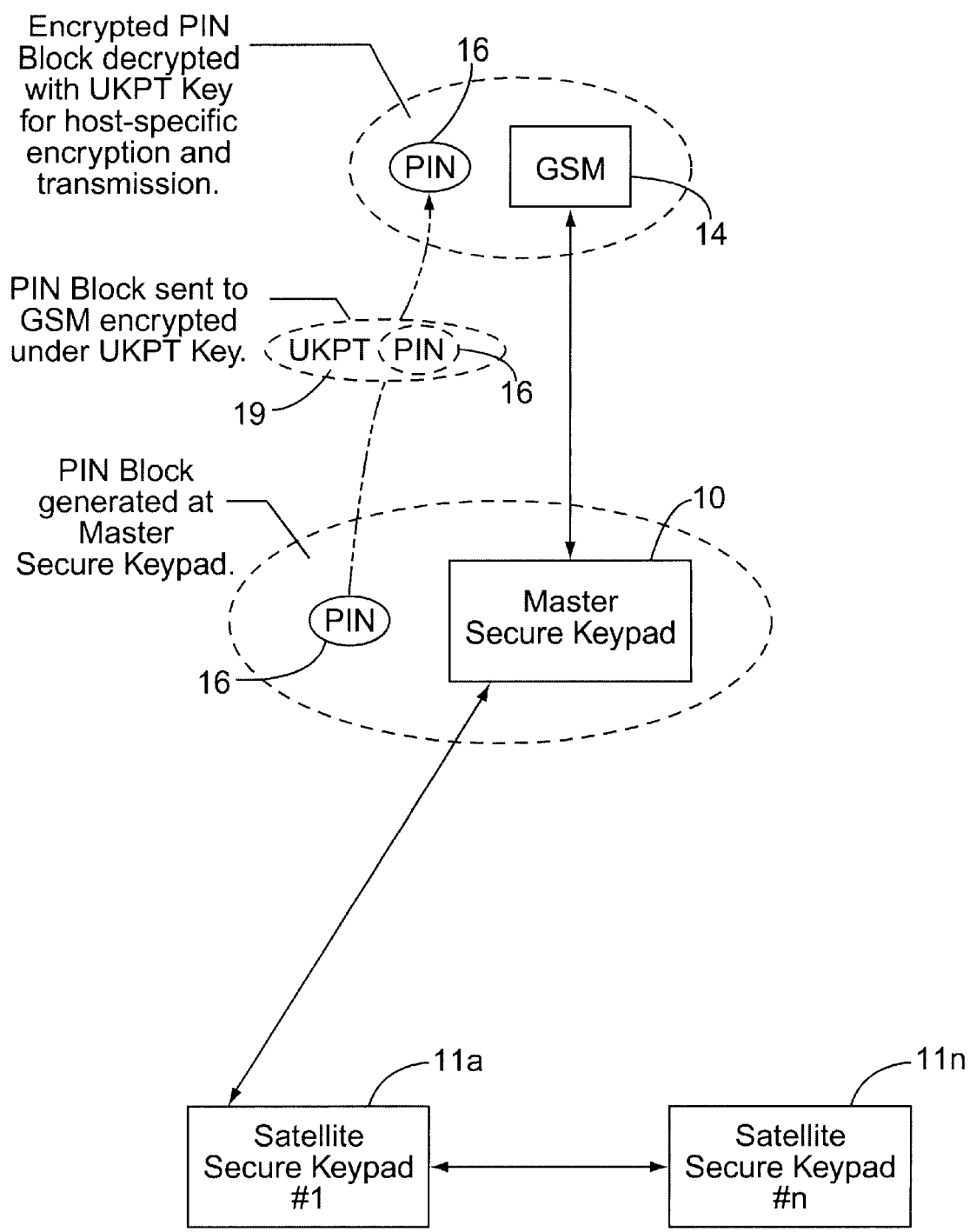
FIG. 21 is a schematic block diagram illustrating transmission of a PIN block from a master secure keypad to a security module according to the third embodiment of the present invention.

FIG. 21 illustrates the transmission of the PIN Block 16 from the master secure keypad 10. The PIN block 16 is encrypted with a UKPT key 19 at the master secure keypad 10 and transmitted to the GSM 14, which decrypts it and securely transmits it to the network host according to the security specification for that particular host.

PIN Block Transmission from Satellite Secure Keypad 11a

Figure 22:
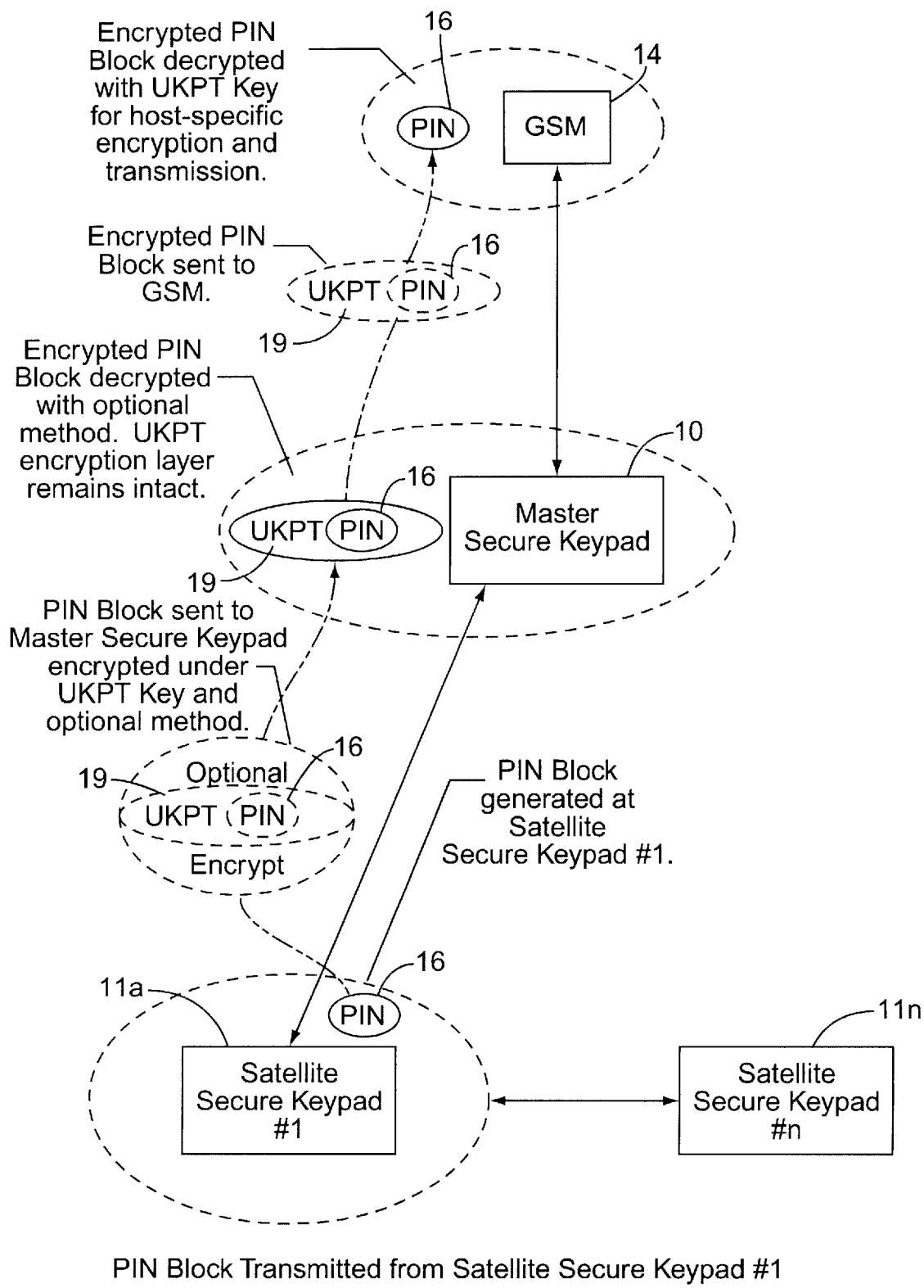
FIG. 22 illustrates transfer of a PIN block from a satellite secure keypad to a master secure keypad according to the third embodiment of the present invention.

FIG. 22 demonstrates a PIN Block being sent from the first satellite secure keypad 11a. The satellite 11a uses the same UKPT key 19 as the master 10 because it derives its keys from the same UKPT base key 18 as the master 10. Further, the master and satellites synchronize their PIN transactions by informing each other of the value of their encryption counters. This allows each device to skip keys that the other devices have used so that no UKPT key 19 is used more than once.

FIG. 22 demonstrates a PIN Block being sent from one child secure keypad. As the next section will show, this process is similar for all child secure keypad devices and the PIN Block is relayed by each parent.

PIN Block Transmission from other Satellite Secure Keypad Devices

Figure 23:
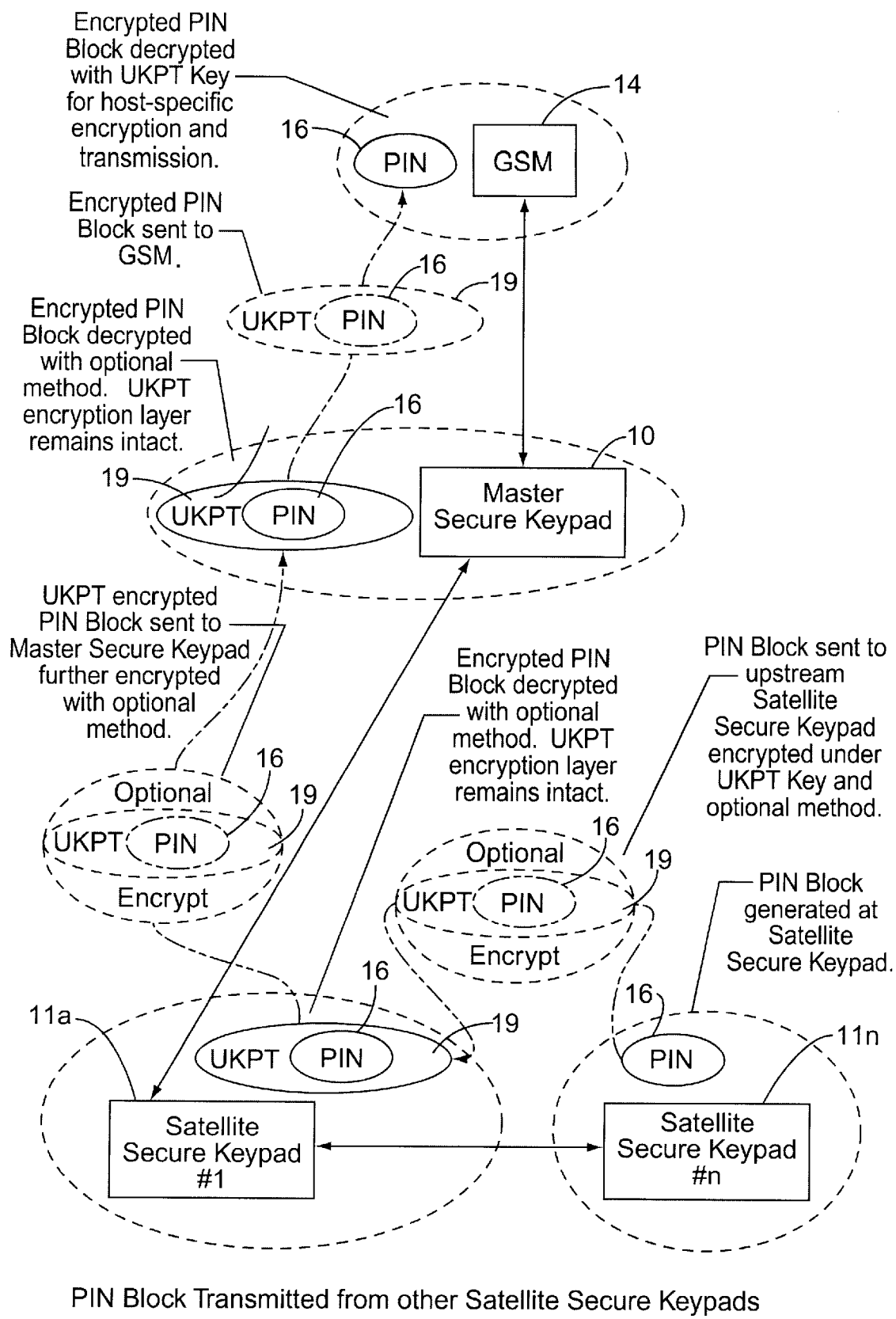
FIG. 23 illustrates transfer of a PIN block from a child secure keypad to a parent secure keypad and from the parent secure keypad to the master secure keypad according to the third embodiment of the present invention.

FIG. 23 demonstrates a PIN Block being sent from other satellite secure keypad devices other than the satellite secure keypad device 11a. Each satellite uses the same UKPT 19 because they all derive their keys from the same UKPT base key 18 as the master.

As FIG. 23 shows, a child secure keypad 11n sends its PIN block 16 under the shared UKPT key 19 and other methods. Any additional encryption to the UKPT key 19 may be removed by the parent 11a. The parent 11a may then consider itself a child to secure keypad devices upstream, apply any of its own additional encryption methods and relay the UKPT-encrypted PIN Block 16 to the parent until that message reaches the master secure keypad 10. The master secure keypad 10 then may remove any additional encryption and send the UKPT-encrypted PIN Block 16 to the GSM 14 for host-specific encryption and transmission.

UKPT Key Synchronization between Secure Keypad Devices

Figure 24:
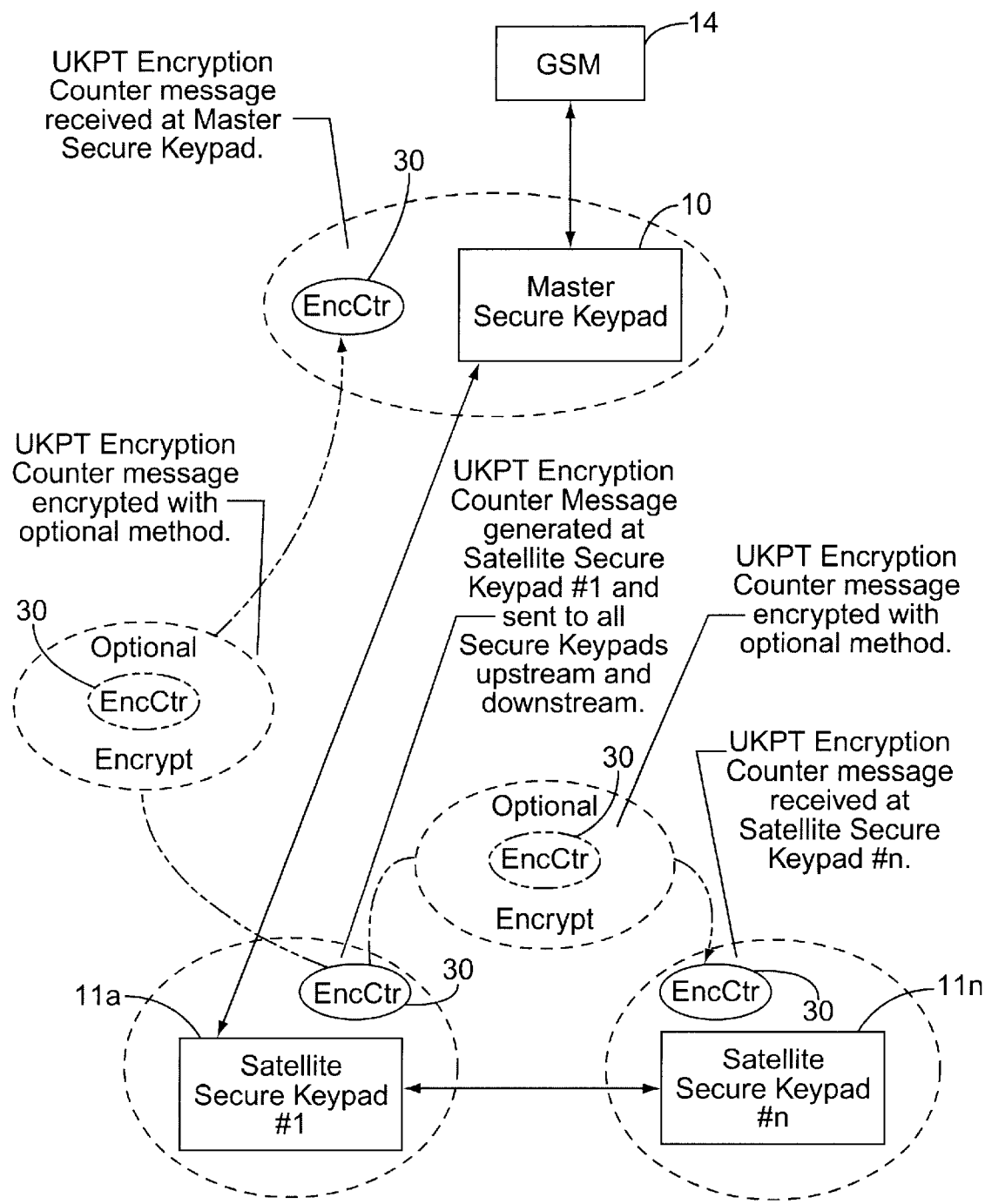
FIG. 24 illustrates synchronization of encryption counters between multiple secure keypads according to the third embodiment of the present invention.

After completion of a PIN transaction, the UKPT key 19 used for that operation cannot be used again from that pay-point. Since multiple secure keypad devices are at one pay-point, they must not use the same UKPT key 19 twice. Therefore, after one secure keypad uses a UKPT key 19, it informs the others of the value of its encryption counter resulting from the transaction. FIG. 24 illustrates encryption counter synchronization when the first satellite secure keypad 11a completes a transaction. Accordingly, in FIG. 24, the first satellite secure keypad 11a transmits its encryption counter 30 to the master secure keypad 10 and to the satellite secure keypad 11n. This information does not require security. However, the normal encryption layers may still be applied to this message as they are applied to any other.

After receiving an encryption counter update from another secure keypad device, the receiving secure keypad updates its UKPT count and associated tables to match the other secure keypad devices. If the receiving secure keypad finds that it actually has completed more transactions than the sender (this is an exception condition), it sends its own encryption counter information to re-synchronize all secure keypad devices into agreement.

This invention is not confined to the architecture of the embodiments described above. These embodiments may be used individually or in combination with one another to best fit the needs of any other implementation. Such combinations can allow secure keypad interconnects using a variety of networking schemes. Each of these interconnects may use the principles discussed in the above embodiments in order to customize this invention to a wide range of secure keypad applications.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method of securely transmitting messages between keypads located at a single pay point by way of a processing board electrically connected to each of the keypads, the method comprising the steps of:
   (a) performing, within the processing board, an exponential key exchange (EKE) session with each of the keypads in order to establish master/session keys for message level encryption;
   (b) sending a message under an established master/session key encryption level from a sending keypad to the processing board;
   (c) decrypting the sent message using the master/session key associated with the sending keypad;
   (d) re-encrypting the message using the master/session key associated with a receiving keypad; and
   (e) relaying the encrypted message from the processing board to the receiving keypad.

2. A method of securely relaying a UKPT key from a security module by way of a first keypad located at a single pay point to a second keypad at the same pay point via a processing board electrically connected to each of the keypads, the method comprising:
   (a) sending a UKPT key from a security module to the processing board encrypted under a first key exchange key (KEK);
   (b) relaying the UKPT key from the processing board to the first keypad encrypted under the first KEK and a first master/session key associated with the first keypad;
   (c) decrypting the master/session key and the first KEK in order to obtain the UKPT key;
   (d) establishing an EKE session with the second keypad via the processing board in order to establish a second KEK;
   (e) relaying the UKPT key back to the processing board encrypted under the first master/session key and the second KEK;
   (f) decrypting the first master/session key from the UKPT key;
   (g) encrypting the UKPT key with a second master/session key associated with the second keypad;
   (h) relaying the encrypted UKPT key to the second keypad; and
   (i) decrypting the second master/session key and second KEK in order to obtain the UKPT key.

3. A method of initiating a secure personal identification number (PIN) transaction from among a plurality of keypads located at a single pay point by way of a processing board electrically connected to each of said plurality of keypads, said method comprising the steps of:
   (a) sending, from the processing board, an encrypted message directing each of the plurality of keypads to activate PIN entry mode; and
   (b) upon receipt of the first PIN digit entry at one of the keypads, directing the remaining keypads to ignore PIN entries until completion of the first PIN entry.

4. A method of arbitrating a secure personal identification number (PIN) transaction from among a plurality of keypads located at a single pay point by way of a processing board electrically connected to each of the plurality of keypads, the method comprising:
   (a) sending a master/session key encrypted message from a first keypad upon receipt of a first PIN entry at the first keypad to a second keypad via the processing board, the message informing the second keypad that the first keypad has obtained control of the PIN transaction; and
   (b) disabling PIN entry mode of the second keypad upon receipt of the message informing the second keypad that the first keypad has obtained control of the PIN transaction.

5. A method of transmitting an encrypted personal identification number (PIN) from one of a plurality of keypads located at a single pay point to a host processing security module via an intermediate processing board, the method comprising:
   (a) generating a PIN block at one of the keypads;
   (b) encrypting the PIN block with a UKPT;
   (c) further encrypting the PIN block with a master/session key;
   (d) relaying the encrypted PIN block to the processing board;
   (e) decrypting the master/session key; and
   (f) relaying the UKPT encrypted PIN block to the security module.

6. A method of UKPT key synchronization between a pair of keypads located at a single pay point, the method comprising:
   (a) sending an encryption counter update message from a first keypad to an intermediate processing board;
   (b) relaying the encryption counter update message from the intermediate processing board to a second keypad; and
   (c) updating the second keypad's encryption counter to reflect the use of the UKPT key by the first keypad thereby keeping both keypads in synchronization with respect to used UKPT values.

7. A method of transmitting an encrypted personal identification number (PIN) from one of a plurality of keypads located at a single pay point to a host processing security module by way of a processing board electrically connected to each of the keypads, the method comprising:
   (a) transmitting messages between keypads;
   (b) relaying a UKPT key from the security module by way of a first keypad to a second keypad;

(c) initiating a secure personal identification number(PIN) transaction from among a plurality of keypads;

(d) arbitrating a secure personal identification number (PIN) transaction from among a plurality of keypads;

(e) transmitting an encrypted personal identification number (PIN) from one of a plurality of keypads to the host processing security module via the processing board; and (f) synchronizing UKPT key usage between a pair of keypads.

8. A system for securely communicating personal identification number information between an plurality of secure keypad devices operatively associated with a single pay point and a security module configured to communicate with a single secure keypad device, the system comprising:

(a) a master secure keypad device capable of being coupled to the security module for receiving a first encryption key from the security module; and (b) a first satellite secure keypad device for receiving the first encryption key from the master secure keypad device, for receiving personal identification number information entered by a customer through the first satellite secure keypad device, and for encrypting the personal identification number information using the first encryption key.

9. The system of claim 8 wherein the first satellite keypad device is coupled to the master secure keypad device.

10. The system of claim 8 wherein the first encryption key is a unique key per transaction (UKPT) key.

11. The system of claim 8 comprising at least one second satellite secure keypad device for receiving the first encryption key from the master secure keypad device, for receiving personal identification number information from a customer, and for encrypting the personal identification number information using the first encryption key.

12. The system of claim 8 wherein, when a customer enters personal identification number information through the first satellite secure keypad device, the first satellite secure keypad device encrypts the personal identification number information using the first encryption key and transmits the encrypted personal identification number information to the master secure keypad device, and the master secure keypad device forwards the encrypted personal identification number information to the security module.

13. The system of claim 8 wherein the master secure keypad device transmits a first message to the first satellite secure keypad device to direct the first satellite secure keypad device to enter a personal identification number (PIN) entry mode for accepting personal identification number information entered by a customer.

14. The system of claim 8 wherein the master secure keypad device is capable of receiving personal identification number information entered by a customer through the master secure keypad device.

15. The system of claim 14 wherein, when a customer enters personal identification number information through the master secure keypad device, the master secure keypad device assumes control of a personal identification number (PIN) entry token by transmitting a PIN entry token notification message to the first satellite secure keypad device.

16. The system of claim 15, wherein, after receiving the PIN entry token notification message, the first satellite secure keypad device ignores personal identification number information entered by a customer through the first satellite secure keypad device.

17. The system of claim 15, wherein, when the customer enters personal identification number information through the first satellite secure keypad device and the first satellite secure keypad device receives a PIN entry token notification message from the master secure keypad device, the first satellite secure keypad device ignores further data entered by the customer through the first satellite secure keypad device.

18. The system of claim 14 wherein, when a customer enters personal identification number information through the first satellite secure keypad device, the first satellite secure keypad device assumes control of a personal identification number (PIN) entry token by transmitting a PIN entry token notification message to the master secure keypad device.

19. The system of claim 18, wherein, after receiving the PIN entry token notification message, the master secure keypad device ignores personal identification number information entered by a customer through the master secure keypad device.

20. The system of claim 10 wherein the master secure keypad device and the first satellite secure keypad device respectively maintain first and second encryption counters indicative of the UKPT key for a transaction.

21. The system of claim 20 wherein, after the master secure keypad device encrypts customer-entered personal identification number information using the UKPT key, the master secure keypad device transmits an encryption counter update message indicative of a current value of the first encryption counter to the first satellite secure keypad device.

22. The system of claim 21 wherein the first satellite secure keypad device updates the value of the second encryption encounter based on the encryption counter update message.

23. The system of claim 20 wherein, after the first satellite secure keypad device encrypts customer-entered personal identification number information using the UKPT key, the first satellite secure keypad device transmits an encryption counter update message indicative of a current value of the second encryption counter to the master secure keypad device and the master secure keypad device updates the value of the first encryption counter based on the encryption counter update message.

24. A system for securely communicating personal identification number information between a plurality of secure keypad devices operatively associated with a single pay point and a security module configured to communicate with a single secure keypad device, the system comprising:

(a) a master secure keypad device capable of being coupled to the security module for receiving a first encryption key from the security module;

(b) a first satellite secure keypad device for receiving the first encryption key from the master secure keypad device, for receiving personal identification number information from a customer, and for encrypting the personal identification number information using the first encryption key; and (c) at least one second satellite secure keypad device for receiving the first encryption key from the first satellite secure keypad device, for receiving personal identification number information from a customer, and for encrypting the personal identification number information using the first encryption key.

25. The system of claim 24 wherein the first satellite secure keypad device is coupled to the master secure keypad device and the second satellite secure keypad device is coupled to the first satellite secure keypad device.

26. The system of claim 24 wherein the first encryption key is a unique key per transaction (UKPT) key.

27. The system of claim 24 wherein, when a customer enters personal identification number information through the second satellite secure keypad device, the second satellite secure keypad device encrypts the personal identification number information using the first encryption key and transmits the encrypted personal identification number information to the first satellite secure keypad device, the first satellite secure keypad device transmits the encrypted personal identification number information to the master secure keypad device, and the master secure keypad device forwards the encrypted personal identification number information to the security module.

28. The system of claim 24 wherein the master secure keypad device transmits a first message to the first satellite secure keypad device to enter a personal identification number (PIN) entry mode for accepting personal identification number information entered by a customer, and the first satellite secure keypad device forwards the first message to the second satellite secure keypad device to direct the second satellite secure keypad device to enter the PIN entry mode.

29. The system of claim 24 wherein the master secure keypad device is capable of receiving personal identification number information entered by a customer through the master secure keypad device.

30. The system of claim 29 wherein, when a customer enters personal identification number information th rough the master secure keypad device, the master secure keypad device assumes control of a personal identification number (PIN) entry token by transmitting a PIN entry token notification message to the first satellite secure keypad device and the first satellite secure keypad device forwards the PIN entry token notification message to the second satellite secure keypad device.

31. The system of claim 30, wherein, after receiving the PIN entry token notification message, the first and second satellite secure keypad devices ignore personal identification number information entered by a customer through the first and second satellite secure keypad devices.

32. The system of claim 30, wherein, when the customer enters personal identification number information through the second satellite secure keypad device and the second satellite secure keypad device receives a PIN entry token notification message from the master secure keypad device or the first satellite secure keypad device, the second satellite secure keypad device ignores further data entered by the customer through the second satellite secure keypad device.

33. The system of claim 29 wherein, when a customer enters personal identification number information through the second satellite secure keypad device, the second satellite secure keypad device assumes control of a personal identification number (PIN) entry token by transmitting a PIN entry token notification message to the first satellite secure keypad device and the first satellite secure keypad device forwards the PIN entry token notification message to the master secure keypad device.

34. The system of claim 26 wherein the master secure keypad device and the first and second satellite secure keypad devices respectively maintain first, second, and third encryption counters indicative of the UKPT key for a transaction.

35. The system of claim 34 wherein, after the master secure keypad device encrypts customer entered personal identification number information using the UKPT key, the master secure keypad device transmits an encryption counter update message indicative of a current value of the first encryption counter to the first satellite secure keypad device and the first satellite secure keypad device forwards the encryption counter update message to the second satellite secure keypad device.

36. The system of claim 35 wherein the first and second satellite secure keypad devices respectively update values of the second and third encryption counters based on the encryption counter update message.

* * * * *